US012560940B2

(12) United States Patent
Kim et al.

(10) Patent No.: US 12,560,940 B2
(45) Date of Patent: Feb. 24, 2026

(54) ROBOT DEVICE OPERATING IN MODE CORRESPONDING TO POSITION OF ROBOT DEVICE AND CONTROL METHOD THEREOF

(71) Applicant: SAMSUNG ELECTRONICS CO., LTD., Suwon-si (KR)

(72) Inventors: Hyomuk Kim, Suwon-si (KR); Woojeong Kim, Suwon-si (KR); Jewoong Ryu, Suwon-si (KR); Aron Baik, Suwon-si (KR); Mideum Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 18/236,064

(22) Filed: Aug. 21, 2023

(65) Prior Publication Data

US 2024/0036585 A1 Feb. 1, 2024

Related U.S. Application Data

(63) Continuation of application No. PCT/KR2023/010410, filed on Jul. 19, 2023.

(30) Foreign Application Priority Data

Jul. 27, 2022 (KR) ........................ 10-2022-0093540
Dec. 1, 2022 (KR) ........................ 10-2022-0165834

(51) Int. Cl.
| | |
|---|---|
| *G05D 1/00* | (2024.01) |
| *G05D 1/246* | (2024.01) |
| *G10L 15/22* | (2006.01) |

(52) U.S. Cl.
CPC ........... *G05D 1/0274* (2013.01); *G05D 1/246* (2024.01); *G10L 15/22* (2013.01); *G10L 2015/223* (2013.01)

(58) Field of Classification Search
CPC .. G05D 1/246; G05D 2109/135; G05D 1/241; G05D 1/243; G05D 2105/32;
(Continued)

(56) References Cited

U.S. PATENT DOCUMENTS

| | | | | |
|---|---|---|---|---|
| 6,374,157 | B1* | 4/2002 | Takamura | .............. B25J 9/1674 |
| | | | | 701/25 |
| 9,456,725 | B2 | 10/2016 | Kim et al. | |

(Continued)

FOREIGN PATENT DOCUMENTS

| | | |
|---|---|---|
| EP | 1 155 787 B1 | 10/2016 |
| EP | 4024154 A1 | 7/2022 |

(Continued)

OTHER PUBLICATIONS

Davide Bacciu et al., "Learning Context-Aware Mobile Robot Navigation in Home Environments", 2014, 6 pages.
(Continued)

*Primary Examiner* — Brandon D Lee
(74) *Attorney, Agent, or Firm* — Sughrue Mion, PLLC

(57) ABSTRACT

Provided is a robot device and method of controlling same, wherein the robot device includes: at least one sensor; at least one memory configured to store at least one instruction; and at least one processor configured to execute the at least one instruction to: based on the robot device being positioned at a first position, control the robot device in a first mode corresponding to the first position, identify, based on sensing data obtained by the at least one sensor, a first event of picking up the robot device by a user and a second event of placing the robot device, and based on an identification that a position of the robot device is changed from the first position to a second position based on new sensing data obtained by the at least one sensor after the first event and
(Continued)

the second event sequentially occur, control the robot device in a second mode corresponding to the second position.

17 Claims, 16 Drawing Sheets

(58) Field of Classification Search
CPC .... G05D 2109/10; G05D 1/245; G05D 1/435; G05D 1/617; G05D 2107/40; G05D 2111/10; G05D 2111/52; G05D 1/2285; G10L 15/22; G10L 2015/223; B25J 5/00; B25J 9/00; B25J 9/16; B25J 13/00; B25J 13/08; B25J 19/02
See application file for complete search history.

(56) References Cited

U.S. PATENT DOCUMENTS

| | | | |
|---|---|---|---|
| 9,798,328 B2 | 10/2017 | Vicenti | |
| 10,152,057 B2 | 12/2018 | Kawamura et al. | |
| 10,383,497 B2 | 8/2019 | Han et al. | |
| 10,391,636 B2 | 8/2019 | Breazeal | |
| 10,969,790 B2 | 4/2021 | Maeda | |
| 11,099,554 B2 | 8/2021 | Lindhé et al. | |
| 11,620,097 B2 | 4/2023 | Kaneko et al. | |
| 2017/0153638 A1* | 6/2017 | Kawamura | G05D 1/0214 |
| 2020/0047337 A1 | 2/2020 | Williams et al. | |
| 2021/0031378 A1* | 2/2021 | Koyama | B25J 13/003 |
| 2022/0019213 A1* | 1/2022 | Haghighat Kashani | G05D 1/0231 |
| 2022/0055224 A1 | 2/2022 | Michaelian et al. | |
| 2022/0083302 A1 | 3/2022 | Kaneko et al. | |
| 2022/0157305 A1 | 5/2022 | Sakurai et al. | |

| | | | |
|---|---|---|---|
| 2022/0291665 A1* | 9/2022 | Sato | B25J 19/02 |
| 2023/0058513 A1 | 2/2023 | Lee et al. | |
| 2023/0195401 A1 | 6/2023 | Kaneko et al. | |

FOREIGN PATENT DOCUMENTS

| | | | |
|---|---|---|---|
| JP | 2017-102538 A | 6/2017 | |
| JP | 2022-51982 A | 4/2022 | |
| KR | 2001-0025103 A | 3/2001 | |
| KR | 10-2007-0027840 A | 3/2007 | |
| KR | 10-2012-0055891 A | 6/2012 | |
| KR | 10-2013-0020259 A | 2/2013 | |
| KR | 10-2021-0044463 A | 4/2021 | |
| KR | 10-2021-0082116 A | 7/2021 | |
| KR | 10-2303546 B1 | 9/2021 | |
| WO | 2019/173321 A1 | 9/2019 | |

OTHER PUBLICATIONS

Satoshi Tsuji et al., "Omnidirectional Proximity Sensor System for Drones Using Optical Time-of-Flight Sensors", IEEJ Transactions on Electrical and Electronic Engineering, Sep. 2021, vol. 17, Issue 1, pp. 19-25, DOI: 10.1002/tee.23483.

Tobias Low et al., "Ground-Plane Classification for Robot Navigation: Combining Multiple Cues Toward a Visual-Based Learning System", 2010 11th International Conference on Control Automation Robotics & Vision, Dec. 2010, pp. 994-999.

International Search Report (PCT/ISA/210) issued by the International Searching Authority on Nov. 7, 2023 in International Application No. PCT/KR2023/010410.

Written Opinion (PCT/ISA/237) issued by the International Searching Authority on Nov. 7, 2023 in International Application No. PCT/KR2023/010410.

Communication issued on Apr. 7, 2025 by the European Patent Office in European Patent Application No. 23846903.5.

\* cited by examiner

| SENSING DATA OF GYRO SENSOR | SENSING DATA OF CLIFF SENSOR | SENSING DATA OF CAMERA SENSOR |

| SENSING DATA OF GYRO SENSOR | SENSING DATA OF CLIFF SENSOR | SENSING DATA OF CAMERA SENSOR |

FIG. 14

| FUNCTIONS OF FIRST MODE | SENSORS FOR EACH FUNCTION |
|---|---|
| FIRST EVENT DETECTION<br>- FEEDBACK INDICATING OCCURRENCE OF FIRST EVENT IN CASE THAT FIRST EVENT OCCURS(FOR EXAMPLE,"WHERE ARE YOU MOVING ME TO?")<br>SECOND EVENT DETECTION<br>RE-IDENTIFYING CHANGED POSITION OF ROBOT DEVICE BY EXECUTING SLAM FUNCTION IN CASE THAT SECOND EVENT OCCURS | - Gyro Sensor<br>- LiDAR Sensor<br>- Cliff Sensor<br>- Camera<br>- IMU<br>- Tactile sensor<br>- Pressure sensor<br>- Shock Sensor<br>- IR Sensor |
| FIRST POSITION (FLOOR SPACE) TRAVELING MODE<br>- HIGH-SPEED TRAVELING<br>- SHOCK DETECTION AND TRAVELING RESTORATION FUNCTION | - LiDAR<br>- Camera<br>- Tactile sensor<br>- Shock Sensor<br>- IR Sensor |
| TASK EXECUTION<br>- USER FOLLOWING TRAVELING<br>- PET PLAYING FUNCTION<br>- INTERACTION FUNCTION | - LiDAR<br>- Camera<br>- Tactile sensor<br>- Shock Sensor<br>- IR Sensor |
| INCREASING VOLUME OF SPEAKER<br><br>RECOGNIZING FACE/SPEECH OF DISTANT USER<br>- RECOGNIZING MAIN OBJECT ON FLOOR SPACE AND UPDATING MAP INFORMATION (SLAM FUNCTION) | - LiDAR Sensor<br>- Camera<br>- Pressure sensor<br>- Shock Sensor<br>- IR Sensor |

FIG. 15

| FUNCTIONS OF SECOND MODE | SENSORS FOR EACH FUNCTION |
|---|---|
| FIRST EVENT DETECTION<br><br>- FEEDBACK INDICATING OCCURRENCE OF FIRST EVENT IN CASE THAT FIRST EVENT OCCURS (FOR EXAMPLE, "WHERE ARE YOU MOVING ME TO?")<br><br>SECOND EVENT DETECTION<br>RE-IDENTIFYING CHANGED POSITION OF ROBOT DEVICE BY EXECUTING SLAM FUNCTION IN CASE THAT SECOND EVENT OCCURS | - Gyro Sensor<br>- LiDAR Sensor<br>- Cliff Sensor<br>- Camera<br>- IMU<br>- Tactile sensor<br>- Pressure sensor<br>- Shock Sensor<br>- IR Sensor |
| SECOND POSITION (FLAT SPACE ON OBJECT) TRAVELING MODE<br>- LOW-SPEED TRAVELING<br>- SHOCK DETECTION AND TRAVELING RESTORATION FUNCTION | - LiDAR<br>- Camera<br>- Tactile sensor<br>- Shock Sensor<br>- IR Sensor |
| TASK EXECUTION<br>- PATROL FUNCTION<br>- PET PLAYING FUNCTION<br>- INTERACTION FUNCTION (VIRTUAL ASSISTANT FUNCTION AND SPEECH RECOGNITION ASSISTANT FUNCTION)<br>- AI SPEAKER FUNCTION<br>- PROJECTOR FUNCTION<br>- MUSIC REPRODUCTION FUNCTION<br>- CLOCK DISPLAY FUNCTION | - LiDAR<br>- Camera<br>- Tactile sensor<br>- Shock Sensor<br>- IR Sensor |
| DECREASING VOLUME OF SPEAKER RECOGNIZING FACE/SPEECH OF NEARBY USER<br>- RECOGNIZING MAIN OBJECT ON FLOOR SPACE AND UPDATING MAP INFORMATION (SLAM FUNCTION) | - LiDAR Sensor<br>- Camera<br>- Pressure sensor<br>- Shock Sensor<br>- IR Sensor |

FIG. 16

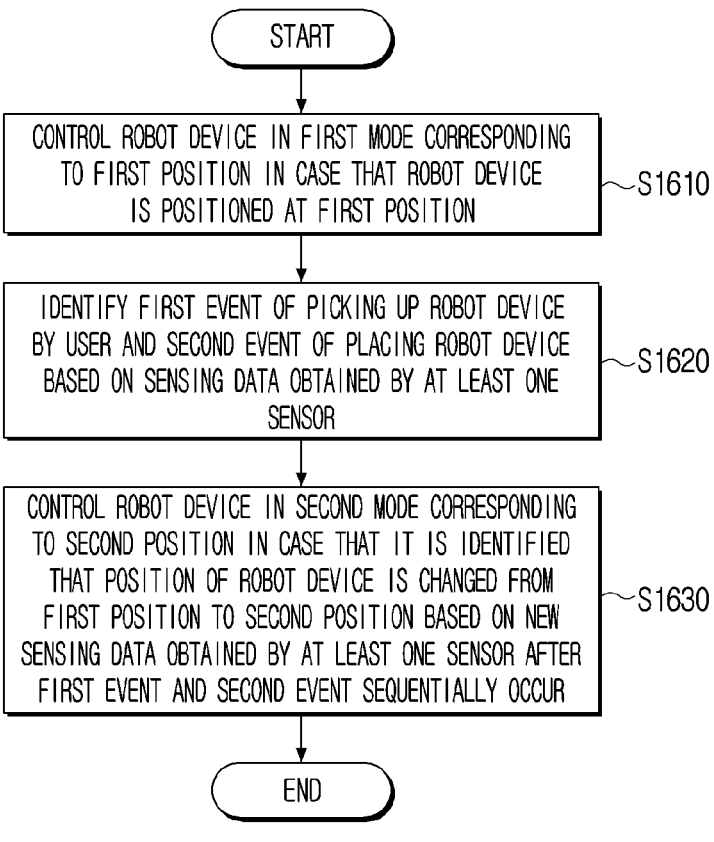

START

CONTROL ROBOT DEVICE IN FIRST MODE CORRESPONDING
TO FIRST POSITION IN CASE THAT ROBOT DEVICE
IS POSITIONED AT FIRST POSITION ～S1610

IDENTIFY FIRST EVENT OF PICKING UP ROBOT DEVICE
BY USER AND SECOND EVENT OF PLACING ROBOT DEVICE
BASED ON SENSING DATA OBTAINED BY AT LEAST ONE
SENSOR ～S1620

CONTROL ROBOT DEVICE IN SECOND MODE CORRESPONDING
TO SECOND POSITION IN CASE THAT IT IS IDENTIFIED
THAT POSITION OF ROBOT DEVICE IS CHANGED FROM
FIRST POSITION TO SECOND POSITION BASED ON NEW
SENSING DATA OBTAINED BY AT LEAST ONE SENSOR AFTER
FIRST EVENT AND SECOND EVENT SEQUENTIALLY OCCUR ～S1630

END

ROBOT DEVICE OPERATING IN MODE CORRESPONDING TO POSITION OF ROBOT DEVICE AND CONTROL METHOD THEREOF

CROSS-REFERENCE TO RELATED APPLICATION(S)

This application is a bypass continuation of International Application No. PCT/KR 2023/010410, filed on Jul. 19, 2023, which is based on and claims priority to Korean Patent Application No. 10-2022-0093540, filed on Jul. 27, 2022 and Korean Patent Application No. 10-2022-0165834, filed on Dec. 1, 2022, in the Korean Intellectual Property Office, the disclosures of which are incorporated by reference herein in their entireties.

BACKGROUND

1. Field

The disclosure relates to a robot device and a control method thereof, and more particularly, to a robot device operating in a mode corresponding to a position of the robot device and a control method thereof.

2. Description of Related Art

In accordance with the recent development of an electronic technology, various types of electronic apparatuses have been developed and distributed.

In particular, various types of robot devices such as a serving robot that replaces a person in stores, cafes, restaurants, a robot cleaner that automatically cleans a region to be cleaned by sucking foreign substances while traveling on its own without user manipulation, and the like have been distributed.

In addition, various types of small robots that interact with various types of Internet of Things (IoT) devices provided in the home and interact with users are also being spread.

Such a small robot detects a surrounding environment and interacts with IoT devices provided in the home based on a sensing result.

The small robot may be referred to as a pet robot that behaves similarly to pets in that a movement range of the small robot is wide and the small robot may interact with users. For such characteristics of the small robot, there has been a demand for a method for providing various and subdivided reactions or executing functions by the small robot in consideration of the current position of the small robot.

SUMMARY

According to an aspect of the disclosure, a robot device includes: at least one sensor; at least one memory configured to store at least one instruction; and at least one processor configured to execute the at least one instruction to: based on the robot device being positioned at a first position, control the robot device in a first mode corresponding to the first position, identify, based on sensing data obtained by the at least one sensor, a first event of picking up the robot device by a user and a second event of placing the robot device, and based on an identification that a position of the robot device is changed from the first position to a second position based on new sensing data obtained by the at least one sensor after the first event and the second event sequentially occur, control the robot device in a second mode corresponding to the second position.

The at least one processor of the robot device may be further configured to, based on the first event occurring, output a feedback indicating occurrence of the first event.

The first position may be included in a floor space of a space where the robot device is positioned, the second position may be included in a flat space on an object positioned in the space, and the flat space may be positioned relatively higher than the floor space.

The at least one memory may store map information corresponding to the space where the robot device is positioned, the second mode may include a plurality of functions, and the at least one processor may be further configured to: identify whether the robot device is able to move within the flat space, based on information regarding the flat space included in the map information, based on identifying that the robot device is able to move within the flat space, execute at least one function requiring movement of the robot device among the plurality of functions of the second mode, and based on identifying that the robot device is unable to move within the flat space, execute at least one function that does not require movement of the robot device among the plurality of functions of the second mode.

The at least one memory may store map information corresponding to the space where the robot device is positioned, and the at least one processor may be further configured to, based on the map information not including information regarding the flat space, obtain information regarding the flat space by controlling the at least one sensor to execute a simultaneous localization and mapping (SLAM) function.

The at least one sensor may include a speech recognition sensor, the at least one memory may store map information corresponding to a space where the robot device is positioned, and the at least one processor may be further configured to: identify, based on a signal being received through the speech recognition sensor, a position from which the signal is received, identify whether the robot device is able to move to the identified position from the second position based on the map information, and based on identifying that the robot device is unable to move to the identified position from the second position, output a feedback requesting occurrence of an event of picking up the robot device and placing the robot device at the first position.

The at least one processor of the robot device may be further configured to: based on the position of the robot device changing from the second position to the first position, identify a movement path for moving to the identified position based on the map information.

The robot device may travel at a relatively higher speed in the second mode than the robot device travels in the first mode.

The at least one sensor may include at least one of a gyro sensor, a camera sensor, a cliff sensor, a pressure sensor, an infrared sensor, or an ultrasonic sensor.

According to an aspect of the disclosure, a control method of a robot device includes: based on the robot device being positioned at a first position, controlling the robot device in a first mode corresponding to the first position; identifying, based on sensing data obtained by at least one sensor, a first event of picking up the robot device by a user and a second event of placing the robot device; and based on an identification that a position of the robot device is changed from the first position to a second position based on new sensing data obtained by the at least one sensor after the first event and the second event sequentially occur, controlling the robot device in a second mode corresponding to the second position.

The control method may further include, based on the first event occurring, outputting a feedback indicating occurrence of the first event.

The first position may be included in a floor space of a space where the robot device is positioned, the second position may be included in a flat space on an object positioned in the space, and the flat space may be positioned relatively higher than the floor space.

The robot device may include at least one memory storing map information corresponding to the space where the robot device is positioned, the second mode may include a plurality of functions, and the controlling the robot device in the second mode may further include: identifying whether the robot device is able to move within the flat space based on information regarding the flat space included in the map information; based on identifying that the robot device is able to move within the flat space, executing at least one function requiring movement of the robot device among the plurality of functions of the second mode; and based on identifying that the robot device is unable to move within the flat space, executing at least one function that does not require movement of the robot device among the plurality of functions of the second mode.

The robot device may include at least one memory storing map information corresponding to the space where the robot device is positioned, and the controlling of the robot device in the second mode may further include, based on the map information not including information regarding the flat space, obtaining information regarding the flat space by controlling the at least one sensor to execute a simultaneous localization and mapping (SLAM) function.

The robot device may include at least one memory storing map information corresponding to a space where the robot device is positioned, and the method may further include: identifying, based on a signal being received through a speech recognition sensor of the robot device, a position from which the signal is received; identifying whether the robot device is able to move to the identified position from the second position based on the map information; and based on identifying that the robot device is unable to move to the identified position from the second position, outputting a feedback requesting occurrence of an event of picking up the robot device and placing the robot device at the first position.

According to an aspect of the disclosure, a non-transitory computer readable medium having instructions stored therein, which when executed by a processor cause the processor to execute a method of controlling a robot device, the method including: based on the robot device being positioned at a first position, controlling the robot device in a first mode corresponding to the first position; identifying, based on sensing data obtained by at least one sensor, a first event comprising picking up the robot device by a user and a second event comprising placing the robot device; and based on an identification that a position of the robot device is changed from the first position to a second position based on new sensing data obtained by the at least one sensor after the first event and the second event sequentially occur, controlling the robot device in a second mode corresponding to the second position.

The first position may be included in a floor space of a space where the robot device is positioned, the second position may be included in a flat space on an object positioned in the space, and the flat space may be positioned relatively higher than the floor space.

The robot device may include at least one memory storing map information corresponding to the space where the robot device is positioned, the second mode may include a plurality of functions, and the controlling the robot device in the second mode may further include: identifying whether the robot device is able to move within the flat space based on information regarding the flat space included in the map information; based on identifying that the robot device is able to move within the flat space, executing at least one function requiring movement of the robot device among the plurality of functions of the second mode; and based on identifying that the robot device is unable to move within the flat space, executing at least one function that does not require movement of the robot device among the plurality of functions of the second mode.

The robot device may include at least one memory storing map information corresponding to the space where the robot device is positioned, and the controlling of the robot device in the second mode may further include based on the map information not including information regarding the flat space, obtaining information regarding the flat space by controlling the at least one sensor to execute a simultaneous localization and mapping (SLAM) function.

The robot device may include at least one memory storing map information corresponding to a space where the robot device is positioned, and the method may further include: identifying, based on a signal being received through a speech recognition sensor of the robot device, a position from which the signal is received; identifying whether the robot device is able to move to the identified position from the second position based on the map information; and based on identifying that the robot device is unable to move to the identified position from the second position, outputting a feedback requesting occurrence of an event of picking up the robot device and placing the robot device at the first position.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 14 is a diagram for describing functions of a first mode according to one or more embodiments of the disclosure;

FIG. 15 is a diagram for describing functions of a second mode according to one or more embodiments of the disclosure; and FIG. 16 is a flowchart for describing a control method of the robot device according to one or more embodiments of the disclosure.

DETAILED DESCRIPTION

Figure 1:
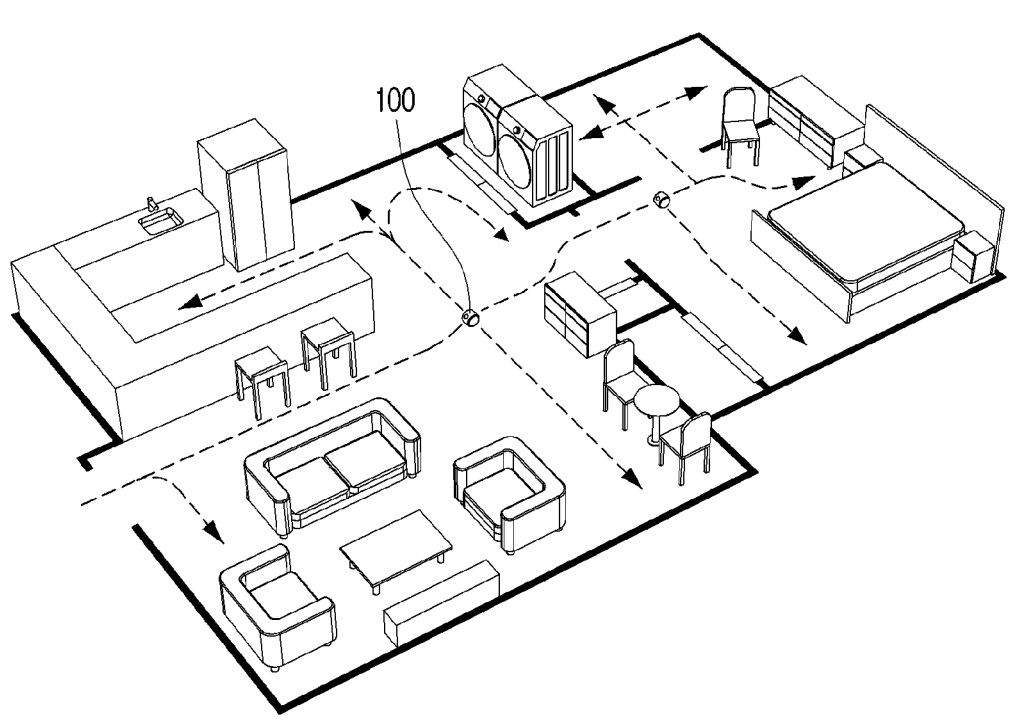
FIG. 1 is a view for describing a robot device according to one or more embodiments of the disclosure.

Hereinafter, embodiments of the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (for example, a numerical value, a function, an operation, a component such as a part, or the like), and does not exclude existence of an additional feature.

The expressions "at least one of A or B" is to be understood to represent only "A", only "B", or "both of A and B".

Expressions "first", "second", or the like, used in the specification may indicate various components regardless of a sequence and/or importance of the components, will be used only to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "-er/or" may perform at least one function or operation, and be implemented as hardware or software or be implemented as a combination of hardware and software. In addition, a plurality of "modules" or a plurality of "-ers/ors" may be integrated in at least one module and be implemented as at least one processor except for a "module" or a "-er/or" that needs to be implemented as specific hardware.

In the disclosure, a term "user" may refer to a person using an electronic apparatus or an apparatus (for example, an artificial intelligence electronic apparatus) using an electronic apparatus.

Hereinafter, embodiments of the disclosure will be described in detail with reference to the accompanying drawings.

FIG. 1 is a view for describing a robot device according to one or more embodiments of the disclosure.

As illustrated in FIG. 1, a robot device 100 may refer to various types of devices having an ability to execute a function by itself. For example, the robot device 100 may refer to a smart device that detects a surrounding environment of the robot device 100 in real time based on sensing data of a sensor (for example, a light detection and ranging (LiDAR) sensor or a camera) and collects information to operate autonomously in addition to executing a simple repetitive function.

The robot device 100 according to one or more embodiments of the disclosure may include a driver including an actuator or a motor. The driver according to one or more embodiments may include a wheel, a brake, and the like, and the robot device 100 may move within a specific space by itself using the wheel, the brake, and the like included in the driver.

Further, the robot device 100 may include a robot joint (or a robot articulation). Here, the robot joint may refer to a component of the robot device 100 for substituting a function of a human arm or hand.

The robot device 100 according to one or more embodiments of the disclosure includes a sensor and may obtain map information corresponding to a space where the robot device 100 is positioned (for example, a predetermined space in the home) based on sensing data of the sensor. For example, the robot device 100 may include a LiDAR sensor and may generate a 2D or 3D map corresponding to a space by using sensing data of the LiDAR sensor and various mapping algorithms. The LiDAR sensor is a sensor that measures a distance to a specific object. Specifically, the LiDAR sensor may emit light to a target object by using a light source and detect light reflected from the target object by a sensor around the light source. Then, the LiDAR sensor may measure a time taken for the light to return and calculate a distance to the target object with high accuracy and reliability by using the speed of light which is always constant. In this way, a 3D (or 2D) map of a specific space may be generated by repeating the measurement periodically in the specific space. Here, the map includes a position, size, shape, and the like of each of a plurality of subspaces (for example, rooms) included in the space, and a position, size, shape, and the like of each of a plurality of obstructions (for example, furniture and home appliances) included in the space.

Further, the robot device 100 may identify a position of the robot device 100 within the map based on the sensing data.

For example, the robot device 100 may identify a movement path based on the map information and identify the position of the robot device 100 within the map information while the robot device 100 moves within the space according to the movement path.

For example, the robot device 100 may perform a simultaneous localization and mapping (SLAM) operation to obtain the map information corresponding to the space where the robot device 100 is positioned and may identify the current position of the robot device 100 within the map information.

The robot device 100 may be classified into industrial, medical, home, military, and exploratory robots according to its field or executable function. According to one or more embodiments, the industrial robot device may be subdivided into a robot device used in a product manufacturing process in a factory, a robot device performing customer service, order reception, and serving in a store, a restaurant, and the like. For example, the robot device 100 may be implemented as a serving robot device capable of transporting a service item to a location desired by a user or to a specific location in various places such as a restaurant, hotel, mart, hospital, clothing store, and the like.

However, this is only an example, and the robot device 100 may be variously classified according to the application field, function, and purpose of use, and is not limited to the example described above.

For example, as illustrated in FIG. 1, the robot device 100 may be implemented as a small robot positioned in a home.

Here, the small robot may interact with various types of electronic apparatuses (for example, the Internet of Things) positioned in the home, recognize the user positioned in the home (for example, user's voice recognition or user's face recognition), move within a space, or provide a content.

For example, the small robot may move around the home to be positioned adjacent to the user, recognize the user, and then provide a music content, a video content, or the like corresponding to a history of the recognized user.

However, this is merely an example, and it is a matter of course that the small robot may execute various functions. For example, the small robot may detect a contamination level while moving in the home and interact with a robot cleaner to make the robot cleaner perform cleaning based on the detected contamination level. The small robot is merely an example of the robot device 100, and the robot device 100 is not limited thereto.

Referring to FIG. 1, in a scenario where the robot device 100 is positioned in a floor space within the home, the robot device 100 may move while avoiding obstructions such as walls, furniture, and home appliances positioned in the floor space.

According to an example, the driver of the robot device 100 may pass over obstructions with a height of about 2 to 3 cm, such as doorsills and carpets, but may not pass over obstructions with a height exceeding 2 to 3 cm.

Therefore, in a scenario where the robot device 100 is positioned in the floor space, the robot device 100 may move only within the floor space (including the obstructions with a height of about 2 to 3 cm), and the robot device 100 may not move to a flat space on an object (for example, furniture or a home appliance) with a height exceeding 2 to 3 cm in the home. Here, the height of 2 to 3 cm is an example of a certain climbable height in a case that the robot device 100 is configured to climb and travel over an obstruction with the certain height, and the certain height is not limited to a specific number.

According to various embodiments of the disclosure, the robot device 100 may output a feedback (for example, a voice feedback) requesting movement from the floor space to the flat space on the object. Conversely, the robot device 100 may also output a feedback requesting movement from the flat space on the object to the floor space.

According to an example, the robot device 100 may operate in a first mode in a case that the robot device 100 is positioned in the floor space, and may operate in a second mode in a case that the robot device 100 is positioned in the flat space on the object. A detailed description thereof will be provided below.

Figure 2:
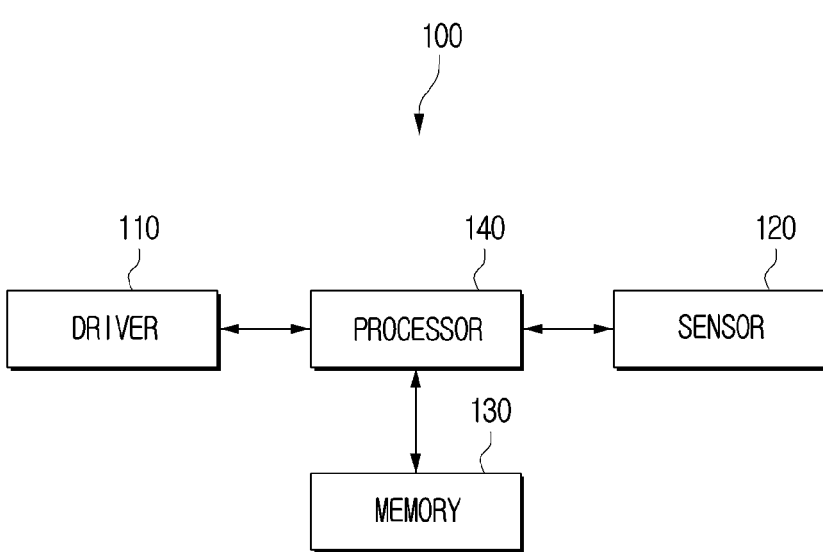
FIG. 2 is a block diagram illustrating a configuration of the robot device according to one or more embodiments of the disclosure.

FIG. 2 is a block diagram illustrating a configuration of the robot device according to one or more embodiments of the disclosure.

The robot device 100 according to one or more embodiments includes a driver 110, at least one sensor 120, a memory 130, and at least one processor 140.

The driver 110 may include a motor, a wheel, a brake, or the like. For example, the robot device 100 may move within a specific space by itself by using the motor and the wheel included in the driver 110 and may stop or control a moving speed within a specific space by using the brake.

Examples of the at least one sensor 120 may include an inertial measurement unit (IMU), a LiDAR sensor, a camera (for example, RGB-D), a cliff sensor, a pressure sensor, an infrared sensor, and an ultrasonic sensor.

Here, the inertial measurement unit (hereinafter, IMU) may include at least one of a gyroscope sensor, an accelerometer sensor, or a magnetometer or compass sensor. Here, the gyroscope sensor may detect an angular velocity (rad/s), the accelerometer sensor may detect an acceleration (m/s$^2$), and the magnetometer or compass sensor may detect the degree of inclination with respect to magnetic north.

As an example, the IMU includes a 3-axis gyroscope sensor and a 3-axis accelerometer sensor and may obtain, as the sensing data, each of roll, pitch, and yaw representing a pose of the robot device 100. Here, the roll may indicate inclination of the robot device 100 in a left-right direction, the pitch may indicate inclination of the robot device 100 in a front-rear direction, and the yaw may indicate inclination of the robot device 100 in a z-axis direction.

For example, the LiDAR sensor may detect a surrounding environment by emitting a laser beam under the control of the processor 140.

For example, the LiDAR sensor may obtain, as the sensing data, a distance to an object adjacent to the robot device 100, a direction in which the object is positioned, and characteristics of the object (for example, geometric characteristics of the object and photometric characteristics of the object). Then, the processor 140 may obtain the space where the robot device 100 is positioned as 2D/3D image information (for example, the map) based on the sensing data.

For example, the processor 140 may obtain the 3D image information based on the sensing data of the LiDAR sensor in a case that the robot device 100 is positioned in the floor space.

For example, the camera may detect the surrounding environment by capturing an image of the surrounding environment of the robot device 100 under the control of the processor 140. For example, the camera may obtain image data including the adjacent object. Then, the processor 140 may analyze the image data to obtain, as the sensing data, the distance to the object adjacent to the robot device 100, the direction in which the object is positioned, and the characteristics of the object (for example, geometric characteristics and photometric characteristics) and obtain the space where the robot device 100 is positioned as the 2D/3D image information (for example, the map) based on the sensing data.

Here, the object may include a dynamic object and a static object. Examples of the dynamic object may include a person and a pet, and examples of the static object may include a wall, furniture (for example, a table, a chair, a bed, or a wardrobe), and a home appliance.

For example, the cliff sensor may be positioned on a front side of the center of a main body of the robot device 100 (for example, the center of gravity of the robot device 100), output an infrared ray to a lower space below the robot device 100, and calculate a distance between the robot device 100 and the lower space by using a time taken for the output infrared ray to be reflected by the lower space and return. According to an example, in a case that the calculated distance exceeds a threshold value, the processor 140 may determine that there is a possibility that the robot device 100 falls from a higher place such as stairs, a threshold, or furniture to a lower place such as the floor space if the robot device 100 continues to travel in the current traveling direction.

However, the disclosure is not limited to the example described above, and it is a matter of course that the robot device 100 may include various types of sensors capable of detecting the surrounding environment.

The memory 130 according to an example may store data necessary for various embodiments of the disclosure. The memory 130 may be implemented in the form of a memory embedded in the robot device 100 or in the form of a memory attachable to and detachable from the robot device 100 depending on the data storage purpose. For example, data for driving the robot device 100 may be stored in the memory embedded in the robot device 100, and data for an extension function of the robot device 100 may be stored in the memory attachable to and detachable from the robot device 100.

In a scenario where the memory 130 is implemented in the form of the memory embedded in the robot device 100, the memory 130 may be at least one of a volatile memory (for example, a dynamic random access memory (DRAM), a static RAM (SRAM), or a synchronous dynamic RAM (SDRAM)) or a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash or a NOR flash), a hard drive, or a solid state drive (SSD)). In a case where the memory 130 is implemented as the memory attachable to and detachable from the robot device 100, the memory 130 may be implemented by a memory card (for example, a compact flash (CF), a secure digital (SD), a micro-SD, a mini-SD, an extreme digital (xD), or a multi-media card (MMC)), an external memory (for example, a USB memory) connectable to a USB port, or the like.

According to an example, the memory 130 may store a computer program including at least one instruction for controlling the robot device 100.

According to one or more embodiments of the disclosure, various data may be stored in an external memory of the processor 140, or some of the data may be stored in an internal memory of the processor 140, and the rest may be stored in the external memory.

In particular, the memory 130 may store the map information corresponding to the predetermined space (for example, inside the home) where the robot device 100 is positioned under the control of the processor 140.

Here, the map information may include a plurality of regions. For example, the processor 140 may identify a region defined (or set) according to a user command in the map as a subspace and divide the space in the map into a plurality of regions (that is, subspaces) according to a user command. For example, once a start point and an end point are defined in the map according to a user command, the processor 140 may identify a region having a rectangular shape based on the start point and the end point as the subspace. However, the rectangular shape is an example of the shape of the subspace, and the shape of the subspace is not limited thereto. It is a matter of course that the subspace may have, for example, a polygonal shape (or a circular shape).

Further, the processor 140 may divide the map information into a plurality of regions by identifying an independent region surrounded by walls based on the sensing data.

Alternatively, the processor 140 may divide the map information into a plurality of regions by identifying an object that separates one region from another region based on the sensing data. Here, the object that separates one region from another region may include a door frame, a window, a fence, stairs, and the like.

It is a matter of course that the map information may include position information, size information, and the like of an object (for example, a wall, furniture (for example, a table, a chair, a bed, or a wardrobe), or stairs, a home appliance) positioned in the predetermined space. Here, the object may include an obstruction that hinders traveling of the robot device 100, an obstruction that the robot device 100 may not travel through (for example, an obstruction that the robot device 100 may not pass over), and the like.

The at least one processor 140 according to one or more embodiments of the disclosure controls the overall operation of the robot device 100.

According to one or more embodiments of the disclosure, the processor 140 may be implemented by a digital signal processor (DSP), a microprocessor, or a time controller (TCON) that processes a digital signal. However, the processor 140 is not limited thereto, and may include one or more of a central processing unit (CPU), a micro controller unit (MCU), a micro processing unit (MPU), a controller, an application processor (AP), a communication processor (CP), an ARM processor, and an artificial intelligence (AI) processor may be defined by these terms. In addition, the processor 140 may be implemented as a system-on-chip (SoC) or a large scale integration (LSI) in which a processing algorithm is embedded or may be implemented in the form of a field programmable gate array (FPGA). The processor 140 may execute various functions by executing computer executable instructions stored in the memory.

The at least one processor 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, and a machine learning accelerator. The at least one processor 140 may control one or any combination of other components of the electronic apparatus, and may perform an operation related to communication or data processing. The at least one processor 140 may execute one or more programs or instructions stored in the memory. For example, the at least one processor 140 may perform a method according to one or more embodiments of the disclosure by executing one or more instructions stored in the memory.

In a case that the method according to one or more embodiments of the disclosure includes a plurality of operations, the plurality of operations may be performed by one processor or a plurality of processors. For example, in a case that a first operation, a second operation, and a third operation are performed by the method according to one or more embodiments, all the first operation, the second operation, and the third operation may be performed by a first processor. Alternatively, the first operation and the second operation may be performed by the first processor (for example, a general-purpose processor) and the third operation may be performed by a second processor (for example, an artificial intelligence processor).

The at least one processor 140 may be implemented by a single-core processor including one core, or by at least one multi-core processor including a plurality of cores (for example, homogeneous multi-core or heterogeneous multi-core). In a case that the at least one processor 140 is implemented by the multi-core processor, each of the plurality of cores included in the multi-core processor may include an internal memory such as a cache memory and an on-chip memory, and a common cache shared by the plurality of cores may be included in the multi-core processor. In addition, each of the plurality of cores (or some of the plurality of cores) included in the multi-core processor may independently read and execute a program command for implementing the method according to one or more embodiments of the disclosure, or all (or some) of the plurality of cores may be linked to read and execute a program command for implementing the method according to one or more embodiments of the disclosure.

In a scenario where the method according to one or more embodiments of the disclosure includes a plurality of operations, the plurality of operations may be performed by one of the plurality of cores included in the multi-core processor or may be performed by the plurality of cores. For example, in a case that the first operation, the second operation, and the third operation are performed by the method according to one or more embodiments, all of the first operation, the second operation, and the third operation may be performed by a first core included in the multi-core processor. Alternatively, the first operation and the second operation may be performed by the first core included in the multi-core processor, and the third operation may be performed by a second core included in the multi-core processor.

In the embodiments of the disclosure, the processor 140 may refer to a system-on-a-chip (SoC) in which one or more processors and other electronic components are integrated, a single-core processor, a multi-core processor, or a core included in a single-core processor or a multi-core processor. Here, the core may be implemented by a CPU, GPU, APU, MIC, DSP, NPU, a hardware accelerator, or a machine learning accelerator, but the embodiments of the disclosure are not limited thereto.

In particular, the at least one processor 140 according to an example may identify the position of the robot device 100 based on the sensing data obtained by the at least one sensor 120.

For example, the processor 140 may identify the position of the robot device 100 in the map information based on the sensing data obtained by the LiDAR sensor. Here, the position may mean the current position of the robot device

100 in the map information obtained by the processor 140 performing the simultaneous localization and mapping (SLAM) operation in the space.

In the disclosure, the position of the robot device 100 is classified into two types for convenience of explanation. For example, the position may be divided into a first position and a second position. Here, the first position may include the floor space of the space where the robot device 100 is positioned, and the second position may refer to the flat space on at least one object positioned in the space.

Referring to FIG. 1, the processor 140 may identify the position of the robot device 100 based on the sensing data obtained by the at least one sensor 120. Then, the processor 140 may identify whether or not the identified position is included in the first position or the second position.

As illustrated in FIG. 1, in a case that the identified position is included in the first position, that is, in a case that the identified current position of the robot device 100 is the floor space, the processor 140 may control the robot device 100 to operate in a first mode corresponding to the first position.

Here, the first mode is a mode in which the robot device 100 may freely travel in the floor space.

According to an example, the floor space is a relatively wide space, and since it is easy to travel while avoiding obstructions, the processor 140 may control the robot device 100 to travel at a high speed.

In addition, in the first mode, the processor 140 may control the robot device 100 to interact with various types of electronic apparatuses positioned in the home, recognize a user positioned in the home (for example, voice recognition for a distant user or facial recognition for a distant user), and move the robot device 100 in such a way as to approach the user positioned in the home (for example, a user who called the robot device 100). For example, the processor 140 may travel in such a way as to follow the user, that is, may execute a user-following traveling function.

In addition, in a case that the position of the robot device 100 is included in the first position, a content may be output at a relatively high volume to provide the content to a plurality of users positioned in the home.

In addition, in a case that the position of the robot device 100 is included in the first position, a patrol traveling function may be executed. For example, the processor 140 may execute the patrol traveling function of moving the robot device 100 at a constant speed according to a movement path having a predetermined pattern or an arbitrary movement path in the flat space on the object. The processor 140 according to one or more embodiments of the disclosure may identify a position change of the robot device 100 based on the sensing data obtained by the at least one sensor 120.

For example, the position of the robot device 100 may be changed according to the operation of the driver provided in the robot device 100, and it is a matter of course that the position of the robot device 100 may be changed by the user arbitrarily moving the robot device 100. A detailed description thereof will be provided with reference to FIG. 3.

Figure 3:
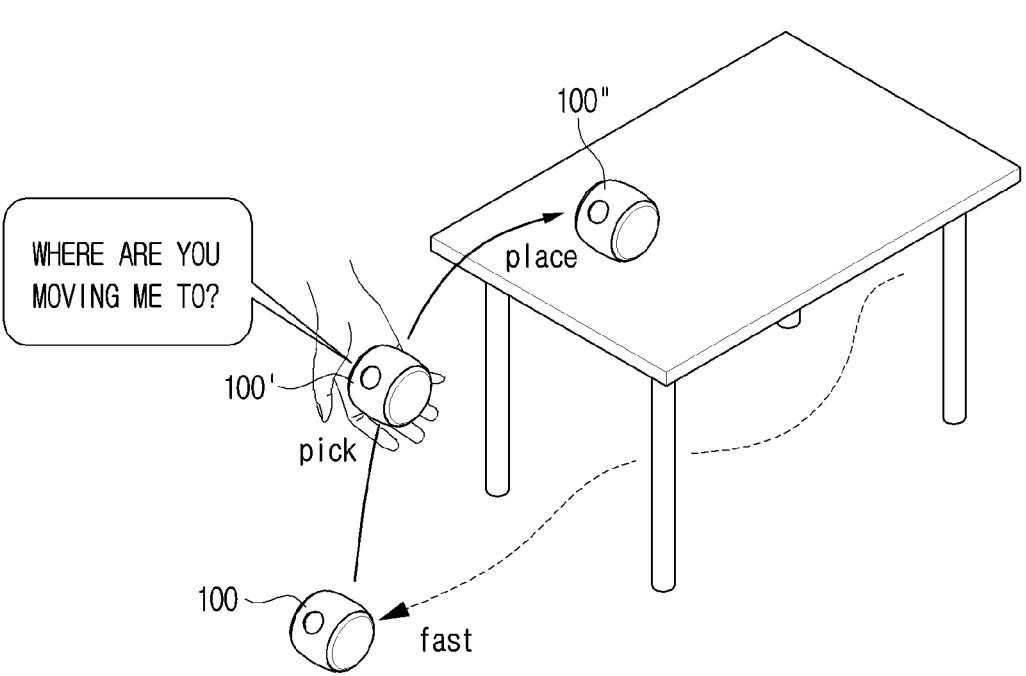
FIG. 3 is a view for describing an event for the robot device according to one or more embodiments of the disclosure.

FIG. 3 is a view for describing an event for the robot device according to one or more embodiments of the disclosure.

Referring to FIG. 3, the processor 140 according to one or more embodiments of the disclosure may identify an event in which the position of the robot device 100 is changed from the first position to the second position, based on the sensing data obtained by the at least one sensor.

First, the processor 140 may identify a first event of picking up the robot device 100 by the user and a second event of placing the robot device 100.

For example, in a case that the sensing data received from the at least one sensor 120 indicates that the position of the robot device 100 is suddenly changed (for example, a z-axis value is suddenly changed to exceed the certain climbable height of the robot device 100, or at least one of an x-axis value or a y-axis value is suddenly changed to exceed the highest traveling speed of the robot device 100), the processor 140 may identify that the first event of picking up the robot device 100 by the user occurs.

For example, the cliff sensor may be positioned on a lower side of the robot device 100 and output an infrared ray. Once the infrared ray is received after being reflected from below (for example, the floor space or the flat space), the cliff sensor may detect the distance between the robot device 100 and the lower space below the robot device 100 based on a time taken from the output of the infrared ray to the reception of the infrared ray. According to an example, in a case that the sensing data (for example, the detected distance) of the cliff sensor indicates that the distance is suddenly changed (for example, a distance change exceeds a certain climbable height range of the driver 110 of the robot device 100), the processor 140 may identify that the first event of picking up the robot device 100 by the user occurs.

Further, in a case that the at least one sensor 120 is implemented by a pressure sensor, and a pressure equal to or higher than a threshold value is detected by the pressure sensor, the processor 140 may identify that the first event of picking up the robot device 100 by the user occurs.

Further, in a case that the at least one sensor 120 is implemented by a wheel lift sensor, and sensing data of the wheel lift sensor indicates that a pressure applied to the wheel of the robot device 100 (or a weight applied to the wheel) does not correspond to the weight of the main body of the robot device 100 (or no pressure is applied to the wheel), the processor 140 may identify that the first event of picking up the robot device 100 by the user occurs.

In a case that the sensing data received from the at least one sensor 120 indicates that the position of the robot device 100 is maintained constant or is changed within a threshold range (for example, the z-axis value is changed in such a way as not to exceed the certain climbable height of the robot device 100, or at least one of the x-axis value or the y-axis value is changed in such a way as not to exceed the highest traveling speed of the robot device 100), the processor 140 may identify that the second event of placing the robot device 100 by the user occurs.

For example, in a case that the sensing data (for example, the detected distance) of the cliff sensor indicates that the distance is maintained constant after being suddenly changed (that is, after the first event occurs), the processor 140 may identify that the second event of placing the robot device 100 by the user occurs.

Further, in a case that the at least one sensor 120 is implemented by a pressure sensor, and a pressure equal to or lower than the threshold value is detected (or no pressure is detected) by the pressure sensor after a pressure equal to or higher than the threshold value is detected, the processor 140 may identify that the second event of placing the robot device 100 by the user occurs.

Further, in a case that the sensing data of the wheel lift sensor indicates that the pressure applied to the wheel of the robot device 100 is decreased to be lower than a threshold value (for example, a value corresponding to the weight of the main body of the robot device 100) (that is, the first event occurs), and then the pressure applied to the wheel corresponds to the weight of the main body of the robot device 100, the processor 140 may identify that the second event of placing the robot device 100 by the user occurs.

In addition, the processor 140 may identify whether or not the first event and the second event occur based on operations of the components included in the robot device 100 in addition to the sensing data of the at least one sensor 120.

For example, the processor 140 may identify whether or not the first event and the second event occur based on a change in motor torque of the driver, a change in frictional force generated in the driver, and the like.

For example, in a case where the frictional force generated in the driver approaches 0 (that is, the first event occurs) because the robot device 100 is positioned in the air by a user 10, and then the frictional force generated in the driver increases, the processor 140 may identify that the second event of placing the robot device 100 by the user occurs.

Then, the processor 140 may re-identify the current position of the robot device 100 after the first event and the second event sequentially occur. For example, in a case where the user arbitrarily picks up the robot device 100 (first event) and then places the robot device 100 (second event), there is a great difference between the position of the robot device 100 before the first event occurs and the position of the robot device 100 after the second event occurs, and thus, the current position of the robot device 100 may be re-identified.

For example, the processor 140 may identify a z-axis position change of the robot device 100 according to the sensing data of the accelerometer sensor included in the sensing data of the IMU, and in a case that the position of the robot device 100 is maintained constant after the identified sudden z-axis position change (the first event and the second event sequentially occur), there is a possibility that the position of the robot device 100 is changed, and thus, the processor 140 may execute a simultaneous localization and mapping (SLAM) function to re-identify the changed position of the robot device 100. The processor 140 may execute the SLAM function to obtain sensing data for re-identifying the position of the robot device 100, and may identify whether or not the position of the robot device 100 is changed from the first position to the second position based on the obtained new sensing data.

As an example, the processor 140 may identify the position of the robot device 100 based on the sensing data of the at least one sensor 120 after the second event occurs. For example, as illustrated in FIG. 3, the position of the robot device 100 before the first event occurs may be the floor space (hereinafter, referred to as the first position), and the position of the robot device 100 after the second event occurs may be the flat space on an object (hereinafter, referred to as the second position).

Hereinafter, a method for identifying the position change of the robot device 100 from the first position to the second position after the first event and the second event sequentially occur according to various embodiments, and a mode change of the robot device 100 according to the position change of the robot device 100 from the first position to the second position, will be described.

In FIG. 3, for convenience of explanation, a case where the first event of arbitrarily picking up the robot device 100 by the user occurs, and then, the second event of placing the robot device 100 occurs, and thus, the position of the robot device 100 is changed from the first position to the second position, is assumed, but the disclosure is not limited thereto.

For example, in a case that the driver of the robot device 100 is configured to be capable of climbing and traveling over an obstruction having a certain height, the processor 140 may control the driver to climb an obstruction having the certain height to change the position of the robot device 100 from the first position to the second position by itself. For example, in a case that the driver of the robot device 100 is configured to be capable of passing over an obstruction having a height exceeding 2 to 3 cm (for example, the flat space on a table), the processor 140 may operate the driver to change the position of the robot device 100 from the first position to the second position by itself. Here, the height of 2 to 3 cm is an example of the certain height, and the certain height is not limited to a specific number As illustrated in FIG. 3, in a case where the first event occurs, the processor 140 may output a feedback indicating the occurrence of the first event.

Referring to FIG. 3, in a case where the first event of picking up the robot device 100 by the user occurs, the processor 140 may output a feedback indicating the occurrence of the first event (for example, a speech feedback such as "Where are you moving me to?" or "Please put me down" or a vibration feedback).

Further, the processor 140 may stop the operation of the driver in a case that the first event occurs.

Hereinafter, a method for identifying, by the processor 140, the position change of the robot device 100 from the first position to the second position after the first event and the second event sequentially occur according to various embodiments will be described.

Figure 4:
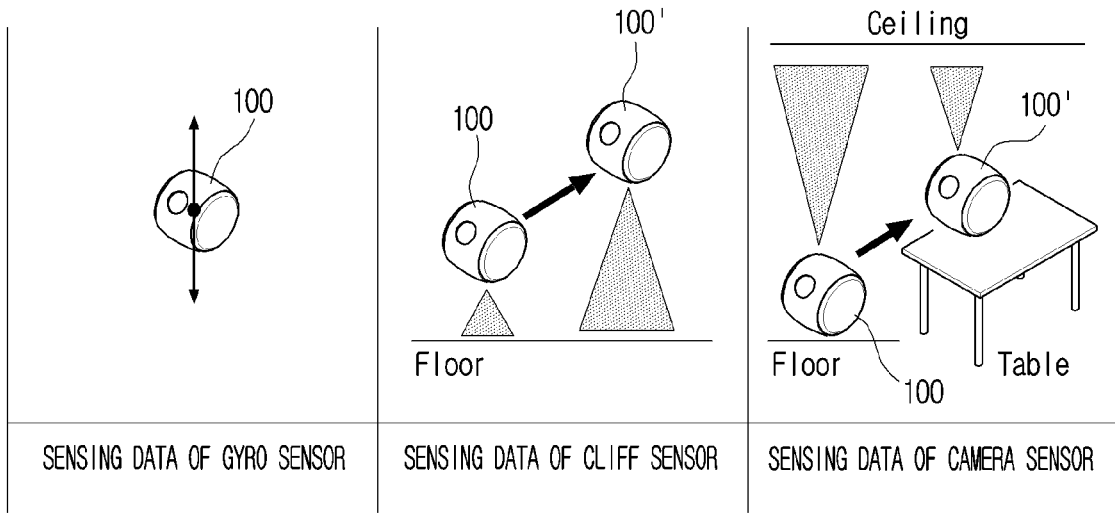
FIG. 4 is a diagram for describing sensing data corresponding to movement from a floor space to a flat space according to one or more embodiments of the disclosure.

FIG. 4 is a diagram for describing sensing data corresponding to movement from the floor space to the flat space according to one or more embodiments of the disclosure.

Referring to FIG. 4, the processor 140 may identify whether or not the position of the robot device 100 is changed from the first position to the second position based on the sensing data obtained by the at least one sensor 120. For example, the at least one sensor 120 may include the IMU.

For example, in a case where a z-axis position change of the robot device 100 included in the sensing data of the IMU exceeds a threshold range (for example, a certain climbable height range of the driver 110 of the robot device 100) while the first event and the second event sequentially occur, and in particular, in a case where the z-axis position change is increased, the processor 140 may identify that the position of the robot device 100 is changed from the first position to the second position.

Further, the at least one sensor 120 may include the cliff sensor, the wheel lift sensor, and the like.

The cliff sensor according to an example may be positioned on the lower side of the main body of the robot device 100 and output a signal (for example, a near-infrared ray, ultrasonic waves, or a laser beam) in a downward direction (that is, a negative z-axis direction). Once the output signal is received after being reflected from the lower space (for example, the floor space or the flat space), the cliff sensor according to an example may identify a time taken from the output of the signal to the reception of the signal and detect the distance between the robot device 100 and the lower space below the robot device 100. In a case where the detected distance is increased while the first event and the second event sequentially occur, the processor 140 may identify that the position of the robot device 100 is changed from the first position to the second position.

Further, the at least one sensor 120 may include the camera (for example, RGB-D). In a case where the sensing data (or image data) of the camera indicates that a distance from the robot device 100 to a ceiling is decreased while the first event and the second event sequentially occur, the processor 140 may identify that the position of the robot device 100 is changed from the first position to the second position.

For example, in a case where the processor 140 is a ToF camera, and a time taken by a signal (for example, a near-infrared ray, ultrasound wave, or a laser beam) output from the ToF camera to return after reaching the ceiling is decreased while the first event and the second event sequentially occur, the processor 140 may identify that the position of the robot device 100 is changed from the first position to the second position.

However, the disclosure is not limited to the above example, and the processor 140 may identify whether or not the position of the robot device 100 is changed from the first position to the second position based on the sensing data of each of a plurality of sensors.

Figure 5:
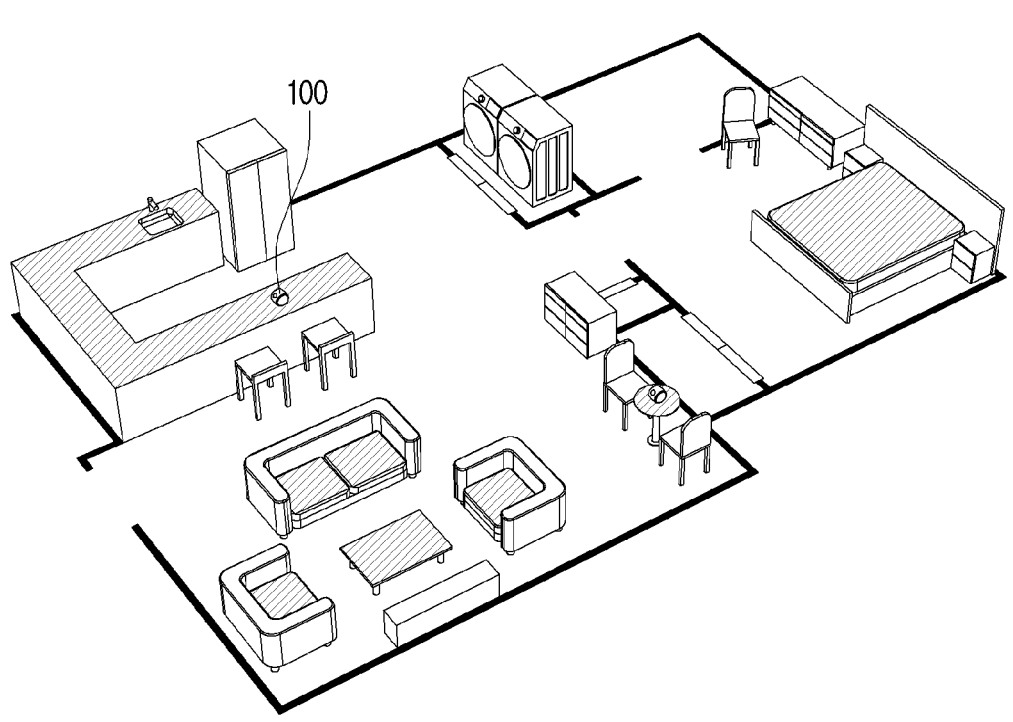
FIG. 5 is a view for describing the flat space on an object according to one or more embodiments of the disclosure.

FIG. 5 is a view for describing the flat space on an object according to one or more embodiments of the disclosure.

Referring to FIG. 5, it is understood that map information may include position information, size information, and the like of the flat space of an object (for example, furniture such as a table, a chair, a bed, or a dining table, or a home appliance) positioned in the predetermined space.

The processor 140 according to one or more embodiments of the disclosure may identify the position of the robot device 100 based on the sensing data obtained by the at least one sensor 120. Then, the processor 140 may identify whether or not the identified position is included in the first position or the second position.

As an example, as described in FIG. 4, in a case where it is identified that the position of the robot device 100 is changed from the first position to the second position after the first event and the second event sequentially occur, the processor 140 may identify that the robot device 100 is positioned not in the floor space but in the flat space on any one of a plurality of objects. For example, the processor 140 does not need to identify the flat space on the object where the robot device 100 is positioned among the plurality of objects positioned in the home, and may identify that the robot device 100 is positioned in the flat space on any one of the plurality of objects.

However, this is merely an example, and the processor 140 may identify the flat space on the object where the robot device 100 is positioned among the plurality of objects positioned in the home based on the sensing data obtained by the at least one sensor 120. For example, the robot device 100 may include 3D map information corresponding to the space, and the processor 140 may identify the flat space on an object corresponding to a specific height in the 3D map information based on a z-axis position change detected by the IMU sensor, a distance to the floor space detected by the cliff sensor, or a distance to the ceiling detected by the camera (for example, the ToF).

Here, the 3D map information may refer to map information in which a space is expressed in 3D and a plurality of subspaces, a plurality of objects, and the like included in the space are implemented in 3D. In particular, unlike 2D map information, the 3D map information may include object information for each height in a 3D shape (that is, an object width, an object height, or the like) of an object included in the space. For example, the 3D map information may include position information, size information, and shape information of the flat space on an object corresponding to a specific height.

Subsequently, the at least one processor 140 may control the robot device 100 to operate in the second mode corresponding to the second position.

Here, the second mode is a mode in which the robot device 100 may travel in the flat space on an object.

According to an example, the flat space on an object is a relatively narrower space compared to the floor space, and it may not be easy for the robot device 100 to avoid an obstruction at the time of traveling. Thus, the processor 140 may control the robot device 100 to travel at a relatively low speed compared to the first mode and may stop the robot device 100.

In addition, in the second mode, the processor 140 may control the robot device 100 to interact with various types of electronic apparatuses positioned in the flat space on an object, recognize the user positioned adjacent to the object (for example, voice recognition for a nearby user or facial recognition for a nearby user), and move the robot device 100 in such a way as to approach a user positioned adjacent to the object among a plurality of users positioned in the home.

In addition, in a case where the position of the robot device 100 is included in the second position, a content may be output at a relatively low volume to provide the content to the user positioned adjacent to the object among the plurality of users positioned in the home.

Figure 6:
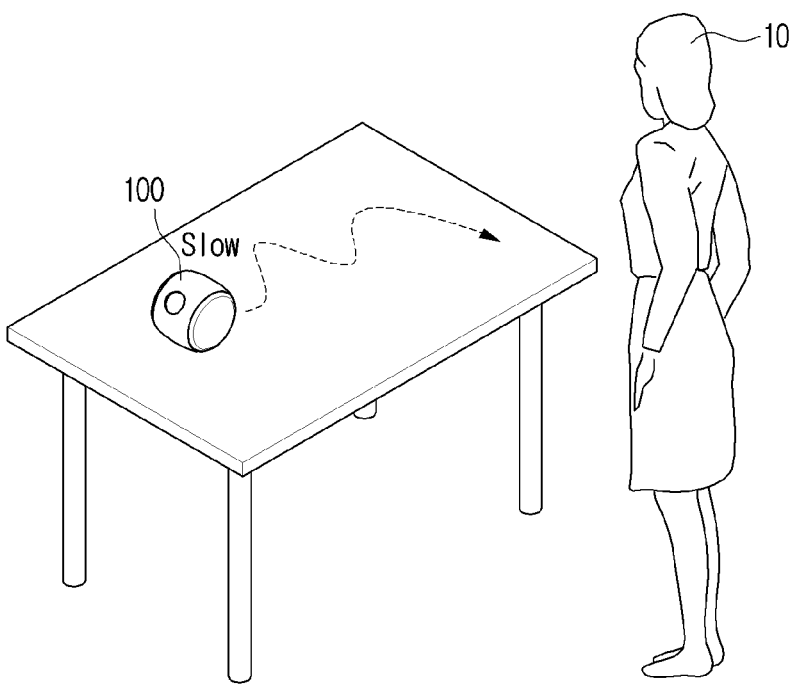
FIG. 6 is a view for describing a mode corresponding to the flat space according to one or more embodiments of the disclosure.
Figure 7:
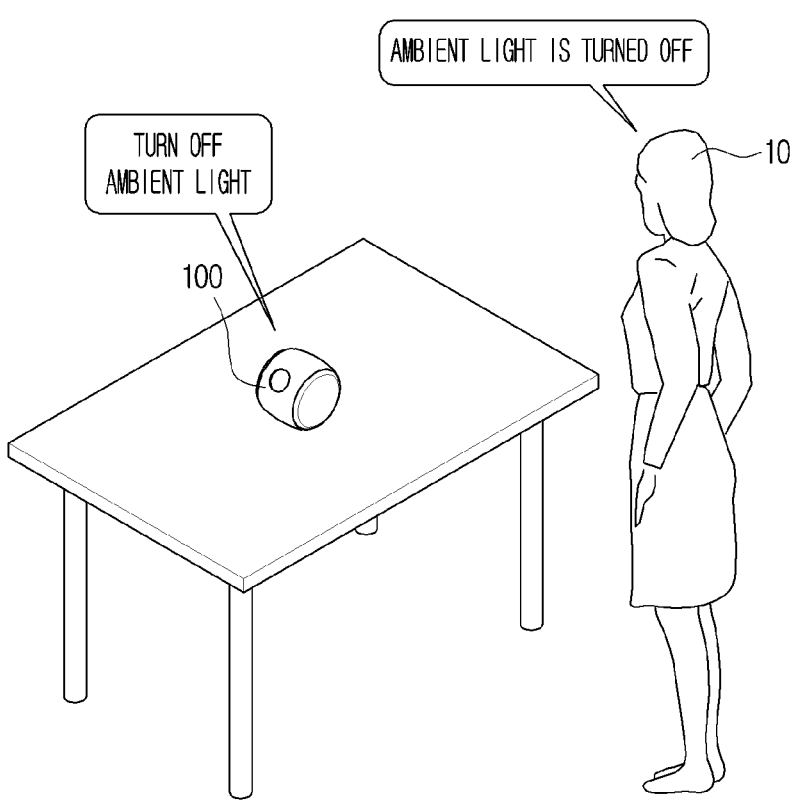
FIG. 7 is a view for describing a mode corresponding to the flat space according to one or more embodiments of the disclosure.
Figure 8:
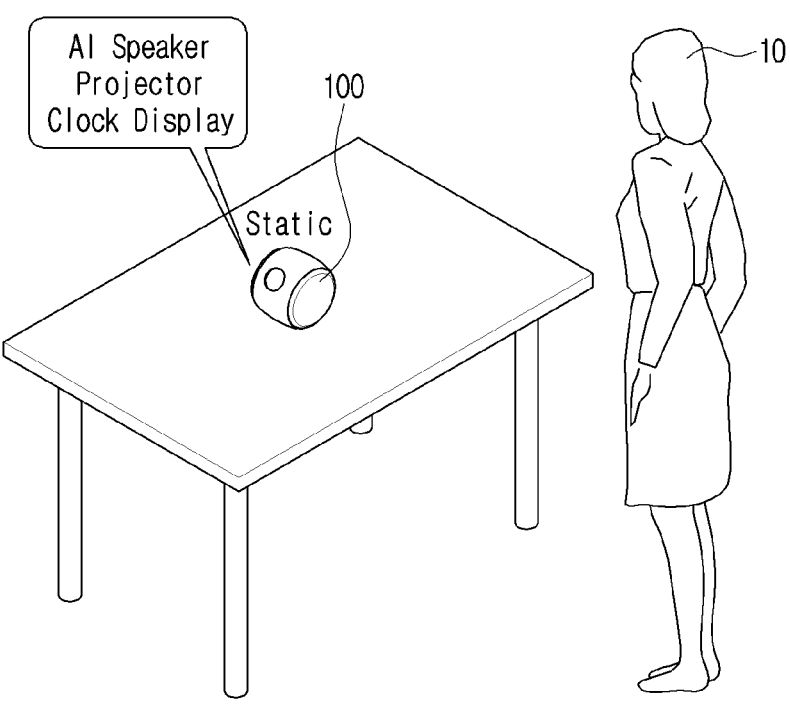
FIG. 8 is a view for describing a mode corresponding to the flat space according to one or more embodiments of the disclosure.

A detailed description thereof will be provided with reference to FIGS. 6 to 8.

FIG. 6 is a view for describing a mode corresponding to the flat space according to one or more embodiments of the disclosure.

In a case where the robot device 100 is positioned in the flat space on an object, the processor 140 according to one or more embodiments of the disclosure may identify whether or not the robot device 100 may move within the flat space on the object based on information regarding the flat space on the object included in the map information (for example, the 3D map information).

Here, the information regarding the flat space included in the map information may include position information, size information, and shape information of the flat space on the object where the robot device 100 is positioned.

The processor 140 may control the at least one sensor 120 to execute the SLAM function in a case that the information regarding the flat space on the object where the robot device 100 is positioned is not identified in the map information. For example, in a case where the at least one sensor 120 is implemented by the LiDAR sensor, the processor 140 may use the sensing data of the LiDAR sensor and various mapping algorithms to obtain information regarding the surrounding environment of the robot device 100 and information regarding surrounding objects, and may use the information to generate the information regarding the flat space on the object.

Then, the processor 140 may update the map information stored in the memory 130 based on the information regarding the flat space. For example, the position, size, and shape of the flat space may be added to the map information based on the information regarding the flat space on the object where the robot device 100 is positioned. For example, the robot device 100 may indicate that a flat space with the position, size, and shape detected by the at least one sensor 120 is positioned at a height corresponding to the current position of the robot device 100 on the 3D map information.

Then, in a case where the robot device 100 may move within the flat space, for example, in a case where the size of the flat space on the object where the robot device 100 is positioned is equal to or larger than a threshold size, the processor 140 may execute at least one function requiring movement of the robot device among a plurality of functions included in the second mode.

For example, as illustrated in FIG. 6, the flat space on the object is relatively narrower than the floor space, and thus, the processor 140 may control the robot device 100 to operate in the second mode. For example, the robot device 100 operating in the second mode may travel at a relatively lower speed than the robot device 100 operating in the first mode.

FIG. 7 is a view for describing a mode corresponding to the flat space according to one or more embodiments of the disclosure.

Here, the function requiring movement of the robot device 100 among the plurality of functions included in the second mode may include a low-speed traveling function as illustrated in FIG. 6, a function of interacting with a user as illustrated in FIG. 7, and the like.

Referring to FIG. 7, the processor 140 may recognize a user positioned in the home (for example, user's voice recognition or user's face recognition), rotate the robot device 100 in such a way that a front surface of the robot device 100 faces the recognized user, and execute a function for conducting a conversation with the user. Here, the function of conducting a conversation with the user and the function of interacting with the user may include a virtual assistant function, a speech recognition assistant function, and the like. The virtual assistant function includes a function of performing various tasks (for example, schedule management or peripheral device control (turn-on, turn-off, or the like)) corresponding to a user command (for example, a voice command) by using a neural network model. FIG. 8 is a view for describing a mode corresponding to the flat space according to one or more embodiments of the disclosure.

In a case where the robot device 100 may not move in the flat space, the processor 140 according to one or more embodiments of the disclosure may execute at least one function that does not require movement of the robot device 100 among the plurality of functions included in the second mode.

Here, the function that does not require movement of the robot device 100 among the plurality of functions included in the second mode may include an AI speaker function, a projector function, a music reproduction function, a clock display function (or an alarm function), and the like.

Here, the AI speaker function may include an AI assistant function and the virtual assistant function of interacting with a user, as in the embodiment illustrated in FIG. 6. The projector function may include a function of outputting a content by controlling a projector provided in the robot device 100. The music reproduction function may include a function of outputting various types of contents such as music by controlling a speaker provided in the robot device 100. The clock display function may include a function of displaying the current time by using a projector or a display provided in the robot device 100. Meanwhile, the above-described functions are examples, and the disclosure is not limited thereto.

In FIG. 8, for convenience of explanation, it is assumed that the function that does not require movement of the robot device 100 among the plurality of functions included in the second mode is executed only in a case that the robot device 100 may not move in the flat space (for example, the size of the flat space is smaller than the threshold size), but this is only an example, and the disclosure is not limited thereto.

For example, it is understood that the processor 140 may execute a function that does not require movement of the robot device 100 among the plurality of functions included in the second mode even in a case that the robot device 100 may move within the flat space as illustrated in FIGS. 6 and 7. Further, the processor 140 may execute at least two functions among the plurality of functions included in the second mode at the same time, or may execute only one function.

Figure 9:
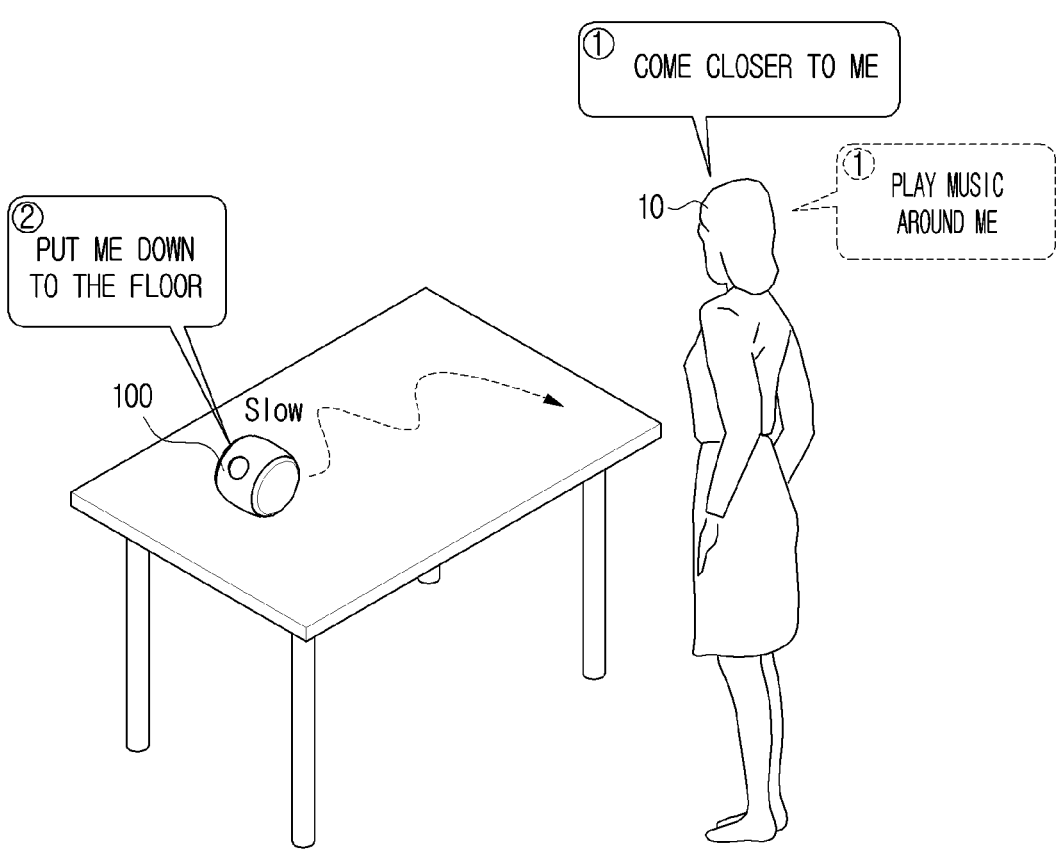
FIG. 9 is a view for describing the robot device requesting movement from the flat space to the floor space according to one or more embodiments of the disclosure.

FIG. 9 is a view for describing the robot device requesting movement from the flat space to the floor space according to one or more embodiments of the disclosure.

In the above example, the robot device 100 requesting movement from the floor space to the flat space on an object or the robot device 100 whose position is changed from the floor space to the flat space on an object by the user is assumed. However, in FIGS. 9 and 10, the robot device 100 requesting movement from the flat space on an object to the floor space or the robot device 100 whose position is changed from the flat space on an object to the floor space by the user is assumed.

The at least one sensor according to one or more embodiments of the disclosure may further include a speech recognition sensor (for example, a microphone).

For example, the processor 140 may perform speech recognition based on a user speech received through the voice recognition sensor.

In a case where the robot device 100 is requested to move closer to the user 10 uttering the user speech according to the speech recognition result, the processor 140 according to one or more embodiments may identify the position of the user 10 uttering the user speech based on the user speech.

For example, in a case where the robot device 100 is positioned in the flat space on an object and the user 10 uttering the user speech is positioned adjacent to the object, the processor 140 may execute a function corresponding to the speech recognition result.

For example, in a case where the function corresponding to the speech recognition result is a function of reproducing a music around the user 10, the processor 140 may execute the music reproduction function in the flat space on the object. Alternatively, the processor 140 may execute the music reproduction function after moving closer to the user 10 in the flat space on the object.

For example, in a case that the robot device 100 is positioned in the flat space on an object, and the user 10 uttering the user speech is not positioned adjacent to the object, the processor 140 may output a feedback requesting a position change of the robot device 100 from the flat space on the object to the floor space to move closer to the user 10.

For example, in a case where the user speech is a speech calling the robot device 100 (for example, "Come closer to me"), the processor 140 may identify whether or not the robot device 100 may move closer to the user 10 from the current position (for example, the flat space on the object) based on the map information according to the speech recognition result.

Then, in a case that the robot device 100 may not move to the current position of the user 10 from the current position (for example, the flat space on the object) of the robot device 100 based on the map information, the processor 140 may output a feedback requesting occurrence of an event of changing the position of the robot device 100 from the second position to the first position (from the flat space on the object to the floor space).

Figure 10:
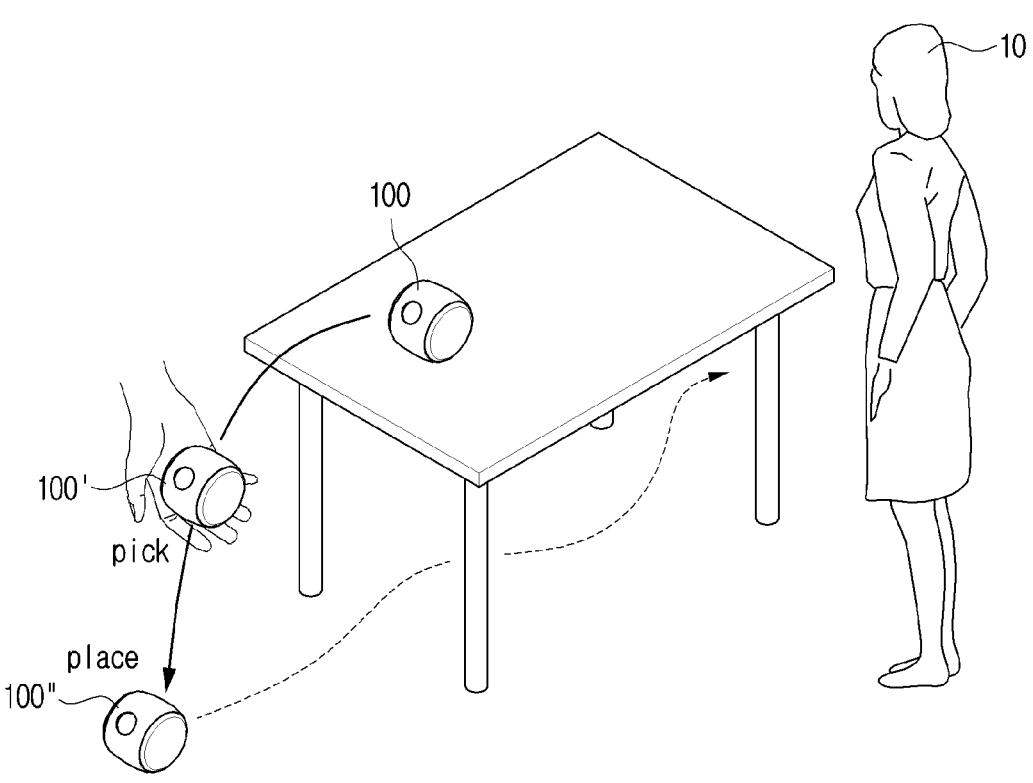
FIG. 10 is a view for describing a mode corresponding to the floor space according to one or more embodiments of the disclosure.

FIG. 10 is a view for describing a mode corresponding to the floor space according to one or more embodiments of the disclosure.

In the embodiment illustrated in FIG. 10, the first event and the second event sequentially occur, but unlike the embodiment illustrated in FIG. 3, the embodiment illustrated in FIG. 10 is an embodiment for describing a case where the position of the robot device 100 is changed from the second position to the first position.

In FIG. 10, for convenience of explanation, a case where the event of arbitrarily picking up the robot device 100 and then placing the robot device 100 by the user is performed to change the position of the robot device 100 from the first position to the second position is assumed, but it is a matter of course that the disclosure is not limited thereto.

For example, in a case that the robot device 100 is implemented in such a way as not to be damaged or out of order even after falling, the processor 140 may deactivate the cliff sensor and then control the driver to change the position of the robot device 100 from the second position to the first position by itself.

Then, after outputting the feedback, the processor 140 may identify a movement path for moving closer to the user 10 based on the map information in a case that the position of the robot device 100 is changed from the second position to the first position.

In addition to the above example, the processor 140 may identify a function corresponding to a user speech or a user command, and in a case that the identified function corresponds to any one of a plurality of functions included in the first mode, the processor 140 may identify whether or not the position of the robot device 100 corresponds to the first position.

Then, in a case that the position of the robot device 100 corresponds to the first position, the processor 140 may control the robot device 100 to operate in the first mode to execute the function corresponding to the user speech or the user command.

Further, in a case that the position of the robot device 100 corresponds to the second position, the processor 140 may output a feedback requesting occurrence of an event of changing the position of the robot device 100 from the second position to the first position (from the flat space on the object to the floor space). Then, in a case that the position of the robot device 100 is changed from the second position to the first position, the processor 140 may control the robot device 100 to operate in the first mode to execute the function corresponding to the user speech or the user command.

As another example, the processor 140 may identify a function corresponding to a user speech or a user command, and in a case that the identified function corresponds to any one of the plurality of functions included in the second mode, the processor 140 may identify whether or not the position of the robot device 100 corresponds to the second position.

Then, in a case that the position of the robot device 100 corresponds to the second position, the processor 140 may control the robot device 100 to operate in the second mode to execute the function corresponding to the user speech or the user command.

Further, in a case that the position of the robot device 100 corresponds to the first position, the processor 140 may output a feedback requesting occurrence of an event of changing the position of the robot device 100 from the first position to the second position (from the floor space to the flat space on the object). Then, in a case that the position of the robot device 100 is changed from the first position to the second position, the processor 140 may control the robot device 100 to operate in the second mode to execute the function corresponding to the user speech or the user command.

Figure 11:
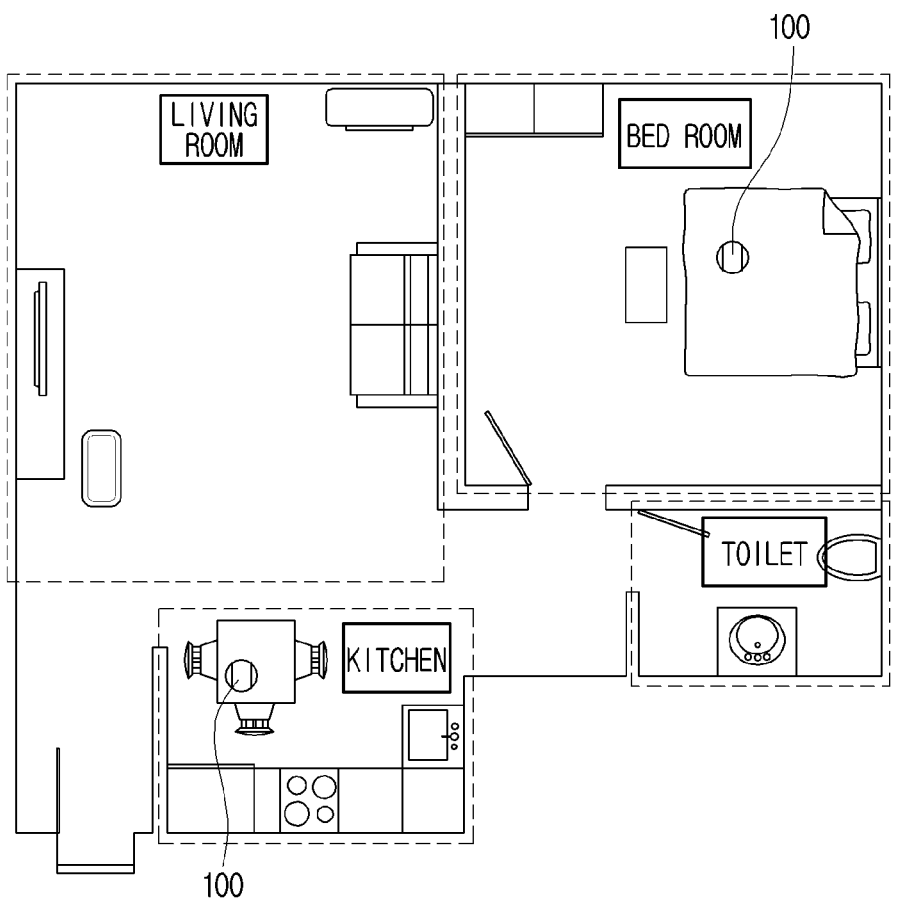
FIG. 11 is a view for describing map information corresponding to the flat space according to one or more embodiments of the disclosure.

FIG. 11 is a view for describing the map information corresponding to the flat space according to one or more embodiments of the disclosure.

Referring to FIG. 11, the processor 140 may identify whether or not the current position of the robot device 100 corresponds to the flat space on an object based on the map information.

For example, the processor 140 may identify the current position of the robot device 100 based on the sensing data. For example, the processor 140 may identify the current position on the map information corresponding to each of an x-axis position change and a y-axis position change of the robot device 100.

In a case that it is identified that the object is positioned at the current position identified based on the 2D map information, the processor 140 may identify that the robot device 100 is positioned not in the floor space but in the flat space on the object.

Then, the processor 140 may control the robot device 100 to operate in the second mode.

Hereinafter, a method for identifying, by the processor 140, the position change of the robot device 100 from the second position to the first position after the first event and the second event sequentially occur according to various embodiments will be described.

Figure 12:
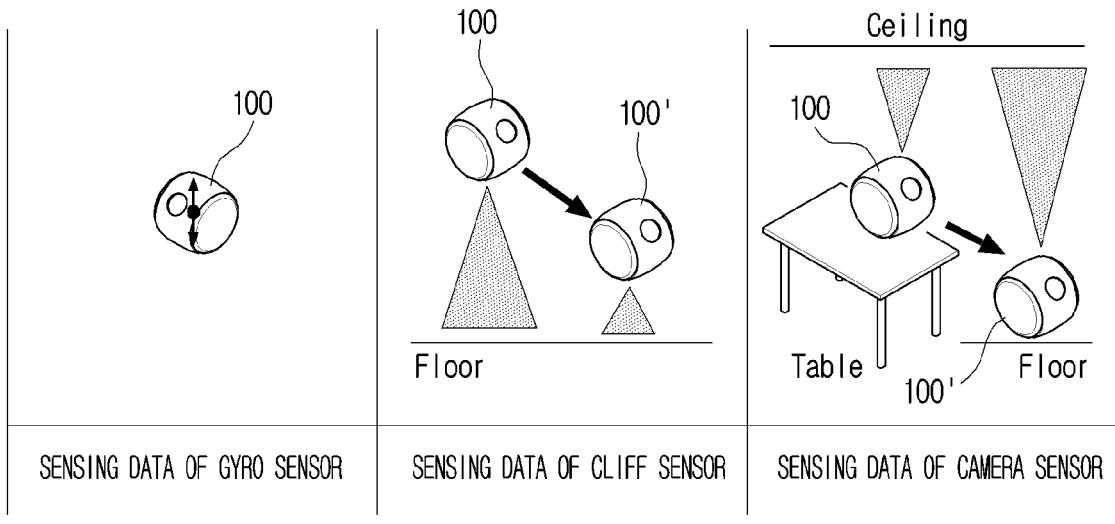
FIG. 12 is a diagram for describing sensing data corresponding to movement from the flat space to the floor space according to one or more embodiments of the disclosure.

FIG. 12 is a diagram for describing sensing data corresponding to movement from the floor space to the flat space according to one or more embodiments of the disclosure.

Referring to FIG. 12, the processor 140 may identify whether or not the position of the robot device 100 is changed from the second position to the first position based on the sensing data obtained by the at least one sensor 120. For example, the at least one sensor 120 may include the IMU.

For example, in a case that a z-axis position change of the robot device 100 included in the sensing data of the IMU exceeds a threshold range (for example, a certain climbable height range of the driver 110 of the robot device 100) while the first event and the second event sequentially occur, and in particular, in a case that the z-axis position change is decreased, the processor 140 may identify that the position of the robot device 100 is changed from the second position to the first position.

Further, the at least one sensor 120 may include the cliff sensor, the wheel lift sensor, and the like.

The cliff sensor according to an example may be positioned on the lower side of the main body of the robot device 100 and output a signal (for example, a near-infrared ray, ultrasonic waves, or a laser beam) in a downward direction (that is, the (−) z-axis direction). Once the output signal is received after being reflected from the lower space (for example, the floor space or the flat space), the cliff sensor according to an example may identify a time taken from the output of the signal to the reception of the signal and detect the distance between the robot device 100 and the lower space below the robot device 100. In a case that the detected distance is decreased while the first event and the second event sequentially occur, the processor 140 may identify that the position of the robot device 100 is changed from the second position to the first position.

Further, the at least one sensor 120 may include the camera (for example, RGB-D). In a case that the sensing data (or image data) of the camera indicates that a distance from the robot device 100 to a ceiling is increased while the first event and the second event sequentially occur, the processor 140 may identify that the position of the robot device 100 is changed from the second position to the first position.

For example, in a case that the processor 140 is a ToF camera, and a time taken by a signal (for example, a near-infrared ray, ultrasound wave, or a laser beam) output from the ToF camera to return after reaching the ceiling is increased while the first event and the second event sequentially occur, the processor 140 may identify that the position of the robot device 100 is changed from the second position to the first position.

However, the disclosure is not limited to the above example, and the processor 140 may identify whether or not the position of the robot device 100 is changed from the second position to the first position based on the sensing data of each of a plurality of sensors.

Figure 13:
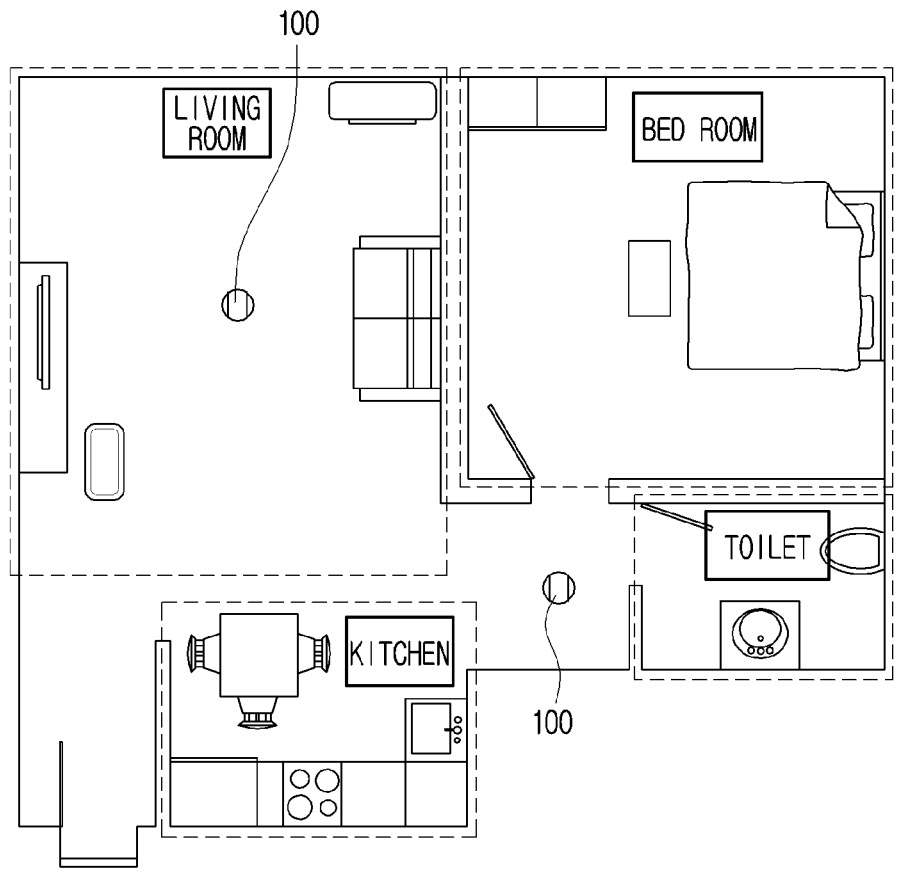
FIG. 13 is a view for describing map information corresponding to the floor space according to one or more embodiments of the disclosure.

FIG. 13 is a view for describing map information corresponding to the floor space according to one or more embodiments of the disclosure.

For example, the processor 140 may identify the current position of the robot device 100 based on the sensing data. For example, the processor 140 may identify the current position on the map information corresponding to each of an x-axis position change and a y-axis position change of the robot device 100.

In a case that it is identified that the object is not positioned at the current position identified based on the map information, the processor 140 may identify that the robot device 100 is positioned not in the flat space on the object but in the floor space.

Then, the processor 140 may control the robot device 100 to operate in the first mode.

FIG. 14 is a diagram for describing the functions of the first mode according to one or more embodiments of the disclosure.

Referring to FIG. 14, the processor 140 may identify the position of the robot device 100, and in a case that the identified position of the robot device 100 is included in the first position, that is, the current position of the robot device 100 is identified as the floor space, the processor 140 may control the robot device 100 to operate in the first mode corresponding to the first position.

According to an example, the first mode may include a plurality of functions. As an example, according to the first mode, the processor 140 may detect the first event and the second event, and in a case that the first event and the second event sequentially occur, the processor 140 may re-identify the position of the robot device 100. Then, the processor 140 may change the mode of the robot device 100 to the first mode in a case that the position of the robot device is changed to the first position according to the re-identification result.

According to an example, the processor 140 may detect whether or not the first event and the second event sequentially occur based on the sensing data of the at least one sensor 120. Here, the at least one sensor 120 may include a gyro sensor, the LiDAR sensor, the cliff sensor, the camera, the IMU, a tactile sensor, the pressure sensor, a shock sensor, the IR sensor, and the like.

The processor 140 may operate in a traveling mode corresponding to the first position according to one of the plurality of functions included in the first mode. According to an example, the traveling mode corresponding to the first position may include a high-speed traveling mode and a shock detection and traveling restoration function. According to an example, the processor 140 may operate in the traveling mode corresponding to the first position based on the sensing data of the at least one sensor 120. Here, the at least one sensor 120 may include the LiDAR sensor, the camera, the tactile sensor, the shock sensor, the IR sensor, and the like.

According to an example, one of the plurality of functions included in the first mode may include a task execution function. The task execution function corresponding to the first mode may include a user following traveling function, a pet playing function (for example, a pet following traveling function or a predetermined sound reproduction function), an interaction function, and the like. According to an example, the processor 140 may execute the task execution function corresponding to the first mode based on the sensing data of the at least one sensor 120. Here, the at least one sensor 120 may include the LiDAR sensor, the camera, the tactile sensor, the shock sensor, the IR sensor, and the like.

According to an example, one of the plurality of functions included in the first mode may include a function of increasing the volume of the speaker and a function of recognizing a face and a speech of a distant user.

For example, in a case that the robot device 100 is positioned in the floor space, a distance between the robot device 100 and the user is increased, and thus, the processor 140 may execute the function of increasing the volume of the speaker for the distant user and the function of recognizing the face and the speech of the distant user. According to an example, the processor 140 may execute the function for recognizing a face and a speech of a distant user based on the sensing data of the at least one sensor 120. Here, the at least one sensor 120 may include the LiDAR sensor, the camera, the pressure sensor, the shock sensor, the IR sensor, and the like.

FIG. 15 is a diagram for describing the functions of the second mode according to one or more embodiments of the disclosure.

Referring to FIG. 15, the processor 140 may identify the position of the robot device 100, and in a case that the identified position of the robot device 100 is included in the second position, that is, the current position of the robot device 100 is identified as the flat space on an object, the processor 140 may control the robot device 100 to operate in the second mode corresponding to the second position.

According to an example, the second mode may include a plurality of functions. As an example, according to the second mode, the processor 140 may detect the first event and the second event, and in a case that the first event and the second event sequentially occur, the processor 140 may re-identify the position of the robot device 100. Then, the processor 140 may change the mode of the robot device 100 to the second mode in a case that the position of the robot device is changed to the second position according to the re-identification result.

According to an example, the processor 140 may detect whether or not the first event and the second event sequentially occur based on the sensing data of the at least one sensor 120. Here, the at least one sensor 120 may include a gyro sensor, a LiDAR sensor, a cliff sensor, a camera, an IMU, a tactile sensor, a pressure sensor, a shock sensor, an IR sensor, and the like.

The processor 140 may operate in a traveling mode corresponding to the second position according to one of the plurality of functions included in the second mode. According to an example, the traveling mode corresponding to the second position may include a low-speed traveling mode and a shock detection and traveling restoration function. According to an example, the processor 140 may operate in the traveling mode corresponding to the second position based on the sensing data of the at least one sensor 120. Here, the at least one sensor 120 may include the LiDAR sensor, the camera, the tactile sensor, the shock sensor, the IR sensor, and the like.

According to an example, one of the plurality of functions included in the second mode may include a task execution function. The task execution function corresponding to the second mode may include a patrol function, the pet playing function (for example, the pet following traveling function or the predetermined sound reproduction function), the interaction function (for example, the virtual assistant function or the speech recognition assistant function, the AI speaker function, the projector function (an image output function using the projector), the music reproduction function, the clock display function, and the like. According to an example, the processor 140 may execute the task execution function corresponding to the second mode based on the sensing data of the at least one sensor 120. Here, the at least one sensor 120 may include the LiDAR sensor, the camera, the tactile sensor, the shock sensor, the IR sensor, and the like.

According to an example, one of the plurality of functions included in the second mode may include a function of decreasing the volume of the speaker and a function of recognizing a face and a speech of a nearby user.

For example, in a case that the robot device 100 is positioned in the flat space of an object, a distance between the robot device 100 and the user is decreased, and thus, the processor 140 may execute the function for decreasing the volume of the speaker for the nearby user and recognizing the face and the speech of the nearby user. According to an example, the processor 140 may execute the function for recognizing a face and a speech of a nearby user based on the sensing data of the at least one sensor 120. Here, the at least one sensor 120 may include the LiDAR sensor, the camera, the pressure sensor, the shock sensor, the IR sensor, and the like.

FIG. 16 is a flowchart for describing a control method of the robot device according to one or more embodiments of the disclosure.

In the control method of the robot device according to one or more embodiments of the disclosure, first, in a case that the robot device is positioned at the first position, the robot device is controlled in the first mode corresponding to the first position (S1610).

Then, the first event of picking up the robot device by the user and the second event of placing the robot device are identified based on the sensing data obtained by the at least one sensor (S1620).

Subsequently, in a case that it is identified that the position of the robot device is changed from the first position to the second position based on new sensing data obtained by the at least one sensor after the first event and the second event sequentially occur, the robot device is controlled in the second mode corresponding to the second position (S1630).

Here, the control method may further include outputting a feedback indicating occurrence of the first event once the first event occurs.

According to an example, the first position may be included in the floor space of the space where the robot device is positioned, the second position may be included in the flat space on an object positioned in the space, and the flat space may be positioned relatively higher than the floor space.

The robot device according to an embodiment may include the map information corresponding to the space where the robot device is positioned, and the controlling of the robot device in the second mode may include identifying whether or not the robot device is movable based on information regarding the flat space included in the map information, executing at least one function requiring movement of the robot device among the plurality of functions included in the second mode in a case that the robot device is movable within the flat space, and executing at least one function that does not require movement of the robot device among the plurality of functions included in the second mode in a case that the robot device is not movable within the flat space.

The robot device according to an embodiment may include the map information corresponding to the space where the robot device is positioned, and the controlling of the robot device in the second mode may include obtaining the information regarding the flat space by controlling the at least one sensor to execute the SLAM function in a case that the information regarding the flat space is not identified in the map information.

The robot device according to an embodiment may include the map information corresponding to the space where the robot device is positioned, and the control method according to the example may further include identifying, once a signal for calling the robot device is received through the speech recognition sensor, a position from which the signal is received, identifying whether or not the robot device is movable to the identified position from the second position based on the map information, and outputting a feedback requesting occurrence of an event of picking up the robot device and then placing the robot device at the first position in a case that the robot device is not movable to the identified position from the second position.

The control method according to an embodiment may further include identifying a movement path for moving to the identified position based on the map information in a case that the event of picking up the robot device and then placing the robot device at the first position occurs after outputting the feedback, and the position of the robot device is changed from the second position to the first position.

The first mode according to an embodiment may be a mode in which the robot device travels at a relatively higher speed than in the second mode.

The at least one sensor according to an embodiment may include at least one of the gyro sensor, the camera sensor, the cliff sensor, the pressure sensor, the infrared sensor, or the ultrasonic sensor. The identifying of the event according to an example may include identifying each of the first event of picking up the robot device and the second event of placing the robot device based on the sensing data.

However, it is understood that various embodiments of the disclosure may be applied to all movable electronic apparatuses as well as the robot device.

Meanwhile, the diverse embodiments described above may be implemented in a computer or an apparatus similar to the computer using software, hardware, or a combination of software and hardware. In some cases, embodiments described in the disclosure may be implemented as a processor itself. According to a software implementation, embodiments such as procedures and functions described in the specification may be implemented as separate software modules. Each of the software modules may perform one or more functions and operations described in the disclosure.

Computer instructions for performing processing operations of the robot device according to various embodiments of the disclosure described above may be stored in a non-transitory computer-readable medium. The computer instructions stored in the non-transitory computer-readable medium allow a specific apparatus to perform the processing operations in the robot device 100 according to various embodiments described above when they are executed by a processor of the specific apparatus.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

Although the embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A robot device comprising:
at least one sensor;
at least one memory configured to store at least one instruction; and
at least one processor configured to execute the at least one instruction,
wherein the at least one instruction, when executed by the at least one processor individually or collectively, causes the robot device to:
based on the robot device being positioned at a first position, control the robot device in a first mode corresponding to the first position,
identify, based on sensing data obtained by the at least one sensor, a first event of picking up the robot device by a user and a second event of placing the robot device on a surface, and
based on an identification that a position of the robot device is changed from the first position to a second position based on new sensing data obtained by the at least one sensor after the first event and the second event sequentially occur, control the robot device in a second mode corresponding to the second position,
wherein the second mode is different from the first mode,
wherein the at least one memory stores map information corresponding to a space where the robot device is positioned,
wherein the second mode comprises a plurality of functions, and
wherein the at least one instruction, when executed by the at least one processor individually or collectively, further causes the robot device to:
identify whether the robot device is able to move on the surface, based on information regarding the surface included in the map information,
based on identifying that the robot device is able to move on the surface, execute at least one function requiring movement of the robot device among the plurality of functions of the second mode, and based on identifying that the robot device is unable to move on the surface, execute at least one function that does not require movement of the robot device among the plurality of functions of the second mode.

2. The robot device of claim 1, wherein the at least one instruction, when executed by the at least one processor individually or collectively, further causes the robot device to, based on the first event occurring, output a feedback indicating occurrence of the first event.

3. The robot device of claim 1, wherein the first position is included in a floor space of the space where the robot device is positioned, the second position is included in a flat space on an object positioned in the space, and the flat space is positioned relatively higher than the floor space.

4. The robot device of claim 1, wherein the at least one instruction, when executed by the at least one processor, further causes the robot device to, based on the map information not including information regarding the surface, obtain information regarding the surface by controlling the at least one sensor to execute a simultaneous localization and mapping (SLAM) function.

5. The robot device of claim 1, wherein the at least one sensor comprises a speech recognition sensor, and
wherein the at least one instruction, when executed by the at least one processor, is further causes the robot device to:
identify, based on a signal being received through the speech recognition sensor, a position from which the signal is received,
identify whether the robot device is able to move to the identified position from the second position based on the map information, and
based on identifying that the robot device is unable to move to the identified position from the second position, output a feedback requesting occurrence of an event of picking up the robot device and placing the robot device at the first position.

6. The robot device of claim 5, wherein the at least one instruction, when executed by the at least one processor, further causes the robot device to:
based on the position of the robot device changing from the second position to the first position, identify a movement path for moving to the identified position based on the map information.

7. The robot device of claim 1, wherein the robot device travels at a relatively higher speed in the second mode than the robot device travels in the first mode.

8. The robot device of claim 1, wherein the at least one sensor comprises at least one of a gyro sensor, a camera sensor, a cliff sensor, a pressure sensor, an infrared sensor, or an ultrasonic sensor.

9. A method of controlling a robot device, the method comprising:
based on the robot device being positioned at a first position, controlling the robot device in a first mode corresponding to the first position;
identifying, based on sensing data obtained by at least one sensor, a first event of picking up the robot device by a user and a second event of placing the robot device on a surface; and
based on an identification that a position of the robot device is changed from the first position to a second position based on new sensing data obtained by the at least one sensor after the first event and the second event sequentially occur, controlling the robot device in a second mode corresponding to the second position, wherein the second mode is different from the first mode,
wherein the robot device comprises at least one memory storing map information corresponding to a space where the robot device is positioned,
wherein the second mode comprises a plurality of functions, and
wherein the controlling the robot device in the second mode further comprises:
identifying whether the robot device is able to move on the surface based on information regarding the surface included in the map information;
based on identifying that the robot device is able to move on the surface, executing at least one function requiring movement of the robot device among the plurality of functions of the second mode; and
based on identifying that the robot device is unable to move on the surface, executing at least one function that does not require movement of the robot device among the plurality of functions of the second mode.

10. The method of claim 9, further comprising, based on the first event occurring, outputting a feedback indicating occurrence of the first event.

11. The method of claim 9, wherein the first position is included in a floor space of the space where the robot device is positioned, the second position is included in a flat space on an object positioned in the space, and the flat space is positioned relatively higher than the floor space.

12. The method of claim 9,
wherein the controlling of the robot device in the second mode further comprises, based on the map information not including information regarding the surface, obtaining information regarding the surface by controlling the at least one sensor to execute a simultaneous localization and mapping (SLAM) function.

13. The method of claim 9,
further comprising:
identifying, based on a signal being received through a speech recognition sensor of the robot device, a position from which the signal is received;
identifying whether the robot device is able to move to the identified position from the second position based on the map information; and
based on identifying that the robot device is unable to move to the identified position from the second position, outputting a feedback requesting occurrence of an event of picking up the robot device and placing the robot device at the first position.

14. A non-transitory computer readable medium having instructions stored therein, which when executed by at least one processor cause the at least one processor to individually or collectively execute a method of controlling a robot device, the method comprising:
based on the robot device being positioned at a first position, controlling the robot device in a first mode corresponding to the first position;
identifying, based on sensing data obtained by at least one sensor, a first event comprising picking up the robot device by a user and a second event comprising placing the robot device on a surface; and
based on an identification that a position of the robot device is changed from the first position to a second position based on new sensing data obtained by the at least one sensor after the first event and the second event sequentially occur, controlling the robot device in a second mode corresponding to the second position, wherein the second mode is different from the first mode, wherein the robot device comprises at least one memory storing map information corresponding to a space where the robot device is positioned, wherein the second mode comprises a plurality of functions, and wherein the controlling the robot device in the second mode further comprises:

identifying whether the robot device is able to move on the surface based on information regarding the surface included in the map information;

based on identifying that the robot device is able to move on the surface, executing at least one function requiring movement of the robot device among the plurality of functions of the second mode; and based on identifying that the robot device is unable to move on the surface, executing at least one function that does not require movement of the robot device among the plurality of functions of the second mode.

15. The non-transitory computer readable medium of claim 14, wherein the first position is included in a floor space of the space where the robot device is positioned, the second position is included in a flat space on an object positioned in the space, and the flat space is positioned relatively higher than the floor space.

16. The non-transitory computer readable medium of claim 14, wherein the controlling of the robot device in the second mode further comprises based on the map information not including information regarding the surface, obtaining information regarding the surface by controlling the at least one sensor to execute a simultaneous localization and mapping (SLAM) function.

17. The non-transitory computer readable medium of claim 14, wherein the method further comprises:

identifying, based on a signal being received through a speech recognition sensor of the robot device, a position from which the signal is received;

identifying whether the robot device is able to move to the identified position from the second position based on the map information; and based on identifying that the robot device is unable to move to the identified position from the second position, outputting a feedback requesting occurrence of an event of picking up the robot device and placing the robot device at the first position.

\* \* \* \* \*